US006027780A

United States Patent [19]

Treleaven et al.

[11] Patent Number: 6,027,780

[45] Date of Patent: Feb. 22, 2000

[54] BOOKLETS AND SELF ADHESIVE LABELS INCLUDING THE SAME

[75] Inventors: Carl W. Treleaven, Greensboro, N.C.; Glenn A. Grosskopf, Lake Zurich, Ill.; Keith R. Dovel, Kernersville, N.C.

[73] Assignees: Pharmagraphics (Midwest), L.L.C., Itasca, Ill.; Pharmagraphics (Southeast)), L.L.C., Greensboro, N.C.

[21] Appl. No.: 08/958,519

[22] Filed: Oct. 27, 1997

Related U.S. Application Data

[60] Division of application No. 08/583,704, Jan. 5, 1996, Pat. No. 5,830,550, which is a continuation-in-part of application No. 08/327,386, Oct. 21, 1994, Pat. No. 5,605,730, which is a continuation-in-part of application No. 08/259,856, Jun. 15, 1994, Pat. No. 5,736,210.

[51] Int. Cl.[7] .................................. B32B 3/00; G09F 3/00

[52] U.S. Cl. .................................. 428/40.1; 281/2; 281/5; 283/81; 428/41.9; 428/42.1; 428/43; 428/124

[58] Field of Search .................................. 428/40.1, 42.1, 428/41.9, 43, 124; 283/81; 281/2, 5

[56] References Cited

U.S. PATENT DOCUMENTS

| | | | |
|---|---|---|---|
| Re. 30,958 | 6/1982 | White | 40/310 |
| Re. 33,396 | 6/1990 | Voltmer et al. | 156/552 |
| Re. 33,579 | 4/1991 | Voltmer et al. | 156/552 |
| 1,273,105 | 7/1918 | Van Dyke et al. | 283/106 |
| 2,191,704 | 2/1940 | Bennett | 91/68 |
| 2,532,017 | 4/1950 | Dahlquist et al | 154/535 |
| 3,032,463 | 5/1962 | Morgan | 156/253 |
| 3,166,186 | 1/1965 | Karn | 206/56 |
| 3,343,978 | 9/1967 | Engelbach | 117/76 |
| 3,551,241 | 12/1970 | Heeb et al. | 156/230 |
| 3,558,388 | 1/1971 | Somerville | 156/108 |
| 3,593,443 | 7/1971 | Demetrius, Jr. et al. | 40/2 R |
| 3,615,992 | 4/1971 | Jeffries et al. | 156/154 |
| 4,010,299 | 3/1977 | Hershey, Jr. et al. | 428/44 |
| 4,128,954 | 12/1978 | White | 40/310 |
| 4,323,608 | 4/1982 | Denny et al. | 428/43 |
| 4,475,969 | 10/1984 | Reed | 156/152 |
| 4,488,922 | 12/1984 | Instance | 156/192 |
| 4,534,582 | 8/1985 | Howard | 283/81 |
| 4,560,432 | 12/1985 | Instance | 156/152 |
| 4,583,765 | 4/1986 | Messinger | 282/9 R |
| 4,621,442 | 11/1986 | Mack | 40/2 R |
| 4,621,837 | 11/1986 | Mack | 283/105 |
| 4,661,189 | 4/1987 | Voy et al. | 156/248 |
| 4,675,062 | 6/1987 | Instance | 156/227 |
| 4,680,080 | 7/1987 | Instance | 156/357 |
| 4,711,686 | 12/1987 | Instance | 156/227 |
| 4,790,563 | 12/1988 | Yamaguchi | 156/510 |
| 4,888,078 | 12/1989 | Instance | 156/249 |
| 4,894,106 | 1/1990 | Instance | 156/227 |
| 4,933,043 | 6/1990 | Instance | 156/248 |
| 4,991,878 | 2/1991 | Cowan et al. | 283/81 |
| 5,021,273 | 6/1991 | Kobayashi . | |
| 5,125,997 | 6/1992 | Smith, Jr. | 156/230 |
| 5,200,243 | 4/1993 | Van Veen | 428/41.7 |
| 5,207,746 | 5/1993 | Jones | 283/81 |
| 5,262,214 | 11/1993 | Instance | 428/40 |
| 5,263,743 | 11/1993 | Jones | 283/81 |
| 5,290,616 | 3/1994 | Cowan | 428/41.8 |
| 5,403,636 | 4/1995 | Crum | 428/40 |
| 5,439,721 | 8/1995 | Pedroli | 428/42.1 |
| 5,700,537 | 12/1997 | Instance | 428/41.9 |

FOREIGN PATENT DOCUMENTS

W0901218 11/1990 WIPO .

*Primary Examiner*—Nasser Ahmad
*Attorney, Agent, or Firm*—Myers Bigel Sibley & Sajovec

[57] ABSTRACT

A label product including a release liner having an upper surface and a booklet disposed on the upper surface of the release liner. The booklet includes an outer piece including a top panel and a bottom panel joined by an outer fold, an inner piece disposed between the top and bottom panels having a pair of interior panels joined by an inner fold, attaching means coupling the outer and inner pieces to one another at the outer and inner folds, and a tear line formed in the bottom panel adjacent the outer fold. A layer of adhesive is interposed between the bottom panel and the upper surface of the release liner.

17 Claims, 15 Drawing Sheets

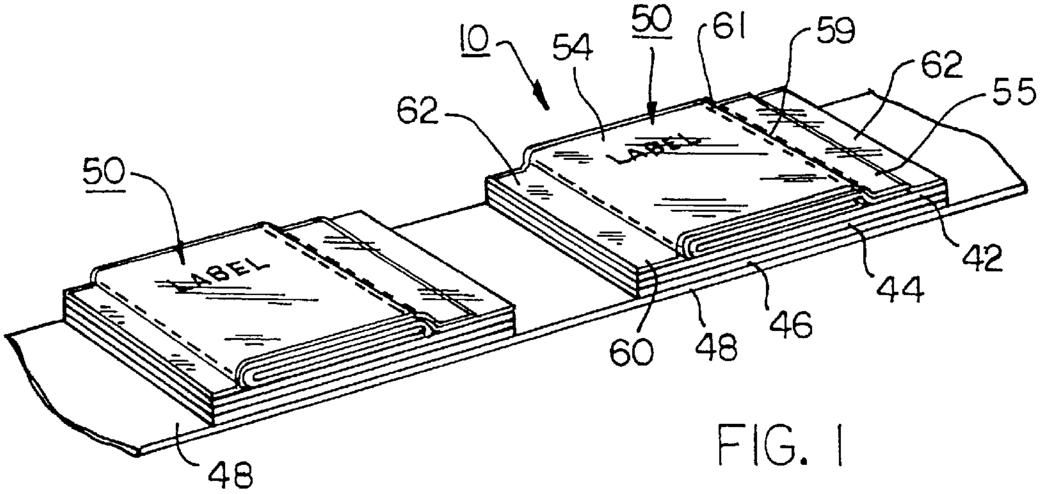
FIG. 1
FIG. 2
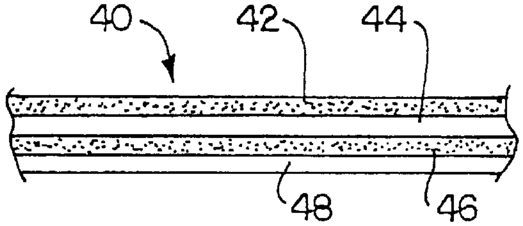
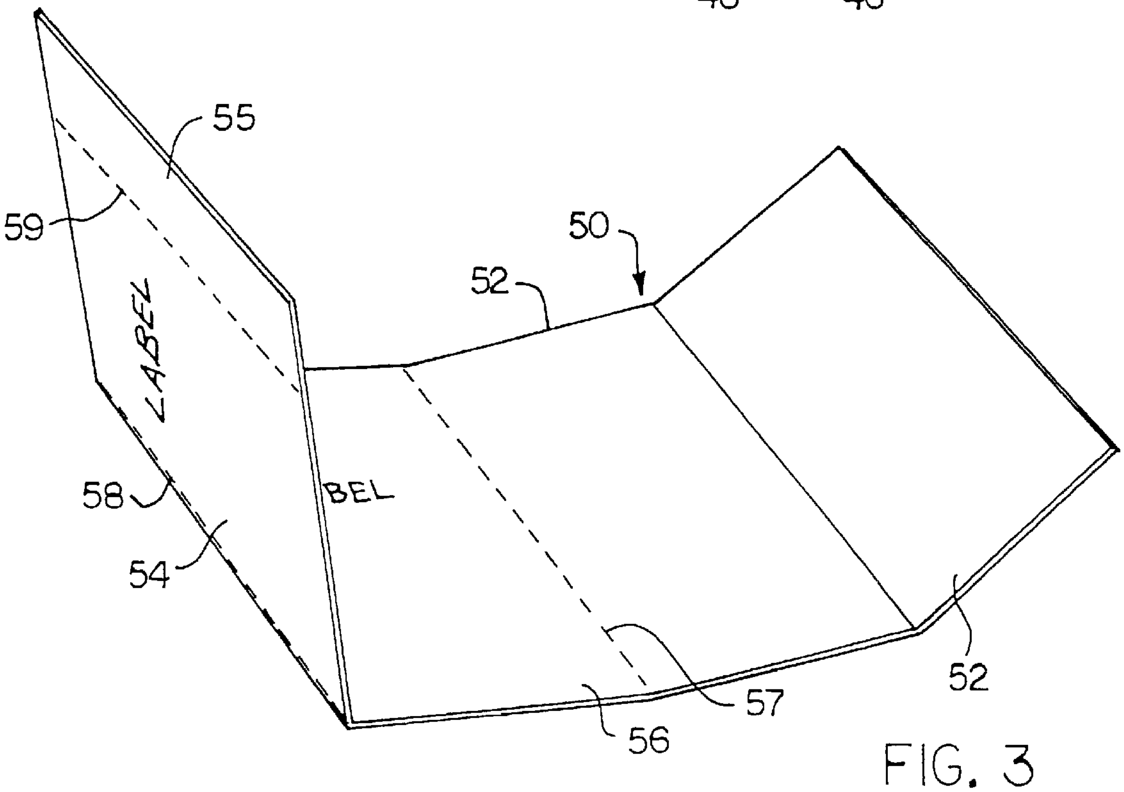
FIG. 3

FIG. 25
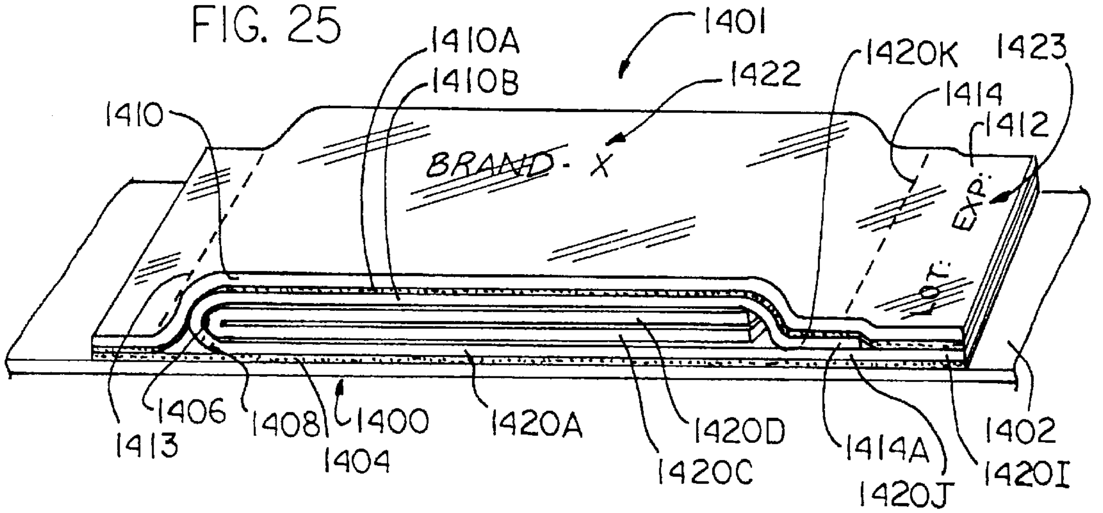
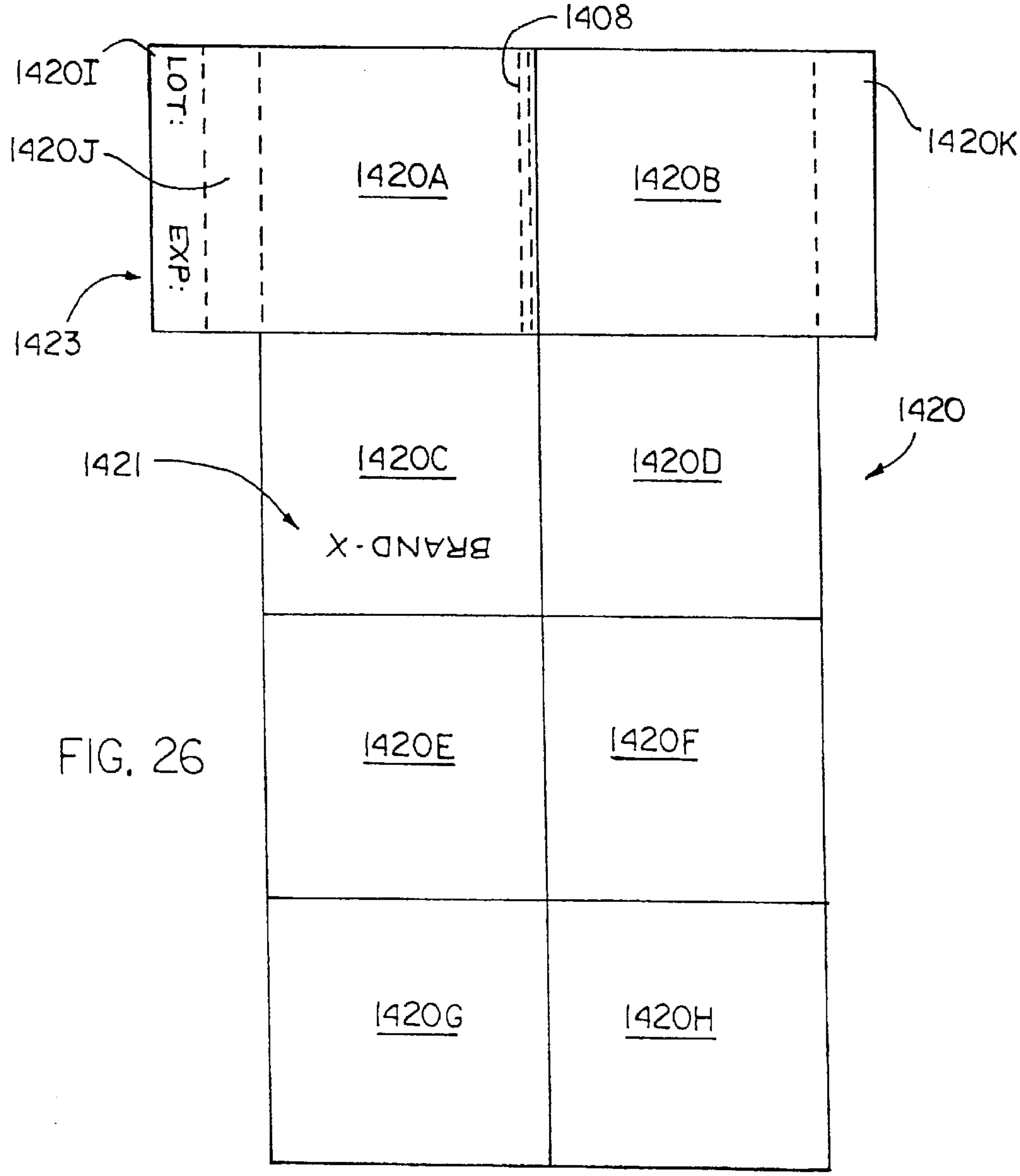
FIG. 26

BOOKLETS AND SELF ADHESIVE LABELS INCLUDING THE SAME

This application is a division of application Ser. No. 08/583,704, filed Jan. 5, 1996, now U.S. Pat. No. 5,830,550, which is a C-I-P application of application Ser. No. 08/327,386, filed Oct. 21, 1994, now U.S. Pat. No. 5,605,730, issued Feb. 25, 1997, which is a C-I-P of application Ser. No. 08/259,856, filed Jun. 15, 1994, now U.S. Pat. No. 5,736,210.

FIELD OF THE INVENTION

The present invention is directed to a package label and method of forming a package label, and, more particularly, to an adhesive backed label having a booklet carried thereon and a method for forming the same from a double coated adhesive tape, an adhesive transfer tape, or a base web.

BACKGROUND OF THE INVENTION

In the packaging of certain chemicals and pharmaceuticals, the manufacturer is often required or desires to provide a considerable amount of information concerning the chemical or pharmaceutical. In the case of chemicals and pharmaceuticals, this is required by government regulations. However, the occasion may also arise, either separate from or in conjunction with government regulations, to provide the doctor, pharmacist or user with instructions on how the product should be used, what the product is, and safety precautions which should be followed in the use of the product. Sometimes the literature, which is generally in the form of folded leaflets, is placed within a box along with the container carrying the chemical or pharmaceutical (referred to as "inserts"). At the same time, in addition to the insert, a primary label must be applied to the outside of the package to remain therewith. This requires a second assembly operation. The placement of leaflets within the box is expensive and a cumbersome operation to perform. Also, it is difficult as well as expensive to insure by later inspection that the proper literature has been inserted in the proper package.

A different approach to solving this problem has developed over the last several years in which the folded literature or leaflets are releasably attached to a face of the container (referred to as "outserts"), either directly to the container itself, or to a base label which, in turn, is secured to the container. The literature may then be removed by the customer. In many of such cases, the portion of the label remaining on the container must carry both an "identification" of the product defined as information such as trademark and/or product identification number, manufacturer and location, etc., as well as certain "statutory information" (defined as lot number and expiration date).

Thus, in order to meet the objectives of such labeling techniques, certain criteria must be met. First of all, the portion of the label which remains after the folded literature is removed must contain both the identification of the product, as well as the statutory information concerning the lot number and expiration date. Further, after the literature leaflet is assembled or affixed to the base label, the indicated area for statutory information concerning lot number and expiration date must be accessible for stamping or printing by the pharmaceutical company at the time the pharmaceutical product is manufactured and packaged. This information must be visible to the consumer in addition to the identification of the product. The folded leaflet portion remains affixed to the label portion until the customer (doctor, pharmacist, consumer) desires its removal. It is critical that the proper literature must be affixed to the proper base label. Finally, all of the above criteria must be accomplished in a manufacturing technique that insures quality and is cost-effective.

Examples of types of labels in the prior art which have addressed some of these criteria are described in U.S. Pat. Nos. 1,273,105 to VanDyke et al.; 4,621,837 to Mack; and 4,323,608 to Denny et al. They are examples of labels which have removable portions thereto.

In U.S. Pat. Nos. 5,207,746 and 5,263,743 to Jones, there are disclosed label constructions whereby the underlying base label is eliminated. The literature, base label, and area for statutory information are all combined into a unitary or integral product. The label constructions as disclosed therein have a bottom identification panel which is adhered to a package by means of a pressure sensitive adhesive coating on its underside. To facilitate handling, the labels are preferably mounted on a silicone coated release liner.

Three methods are known for applying adhesive to a folded leaflet or to the underside of a separate base label as taught in the prior art. An adhesive patch may be applied to the upper surface of a release liner followed by the placement of an outsert or base label thereon. Alternatively, adhesive may be applied to the underside of the bottom panel of the outsert or to the underside of the base label followed by the placement of the outsert or base label onto the release liner. Finally, a continuous layer of adhesive may be applied to the release liner followed by the placement of outserts or base labels thereon.

Each of the above-described methods for applying pressure sensitive adhesive suffers significant drawbacks and limitations. For the first two methods, it is generally necessary to coordinate the application of adhesive and bottom panels or base labels to insure proper registration. If patches of adhesive are used, they must be completely covered by the outserts or base label to avoid binding when the strip of labels is ultimately rewound and unwound. Where adhesive is applied on the underside of the bottom panel or base label, it is necessary to stop applying when an outsert or base label is not in place to avoid applying adhesive over the work area.

If a continuous strip of adhesive is applied to the release liner, either a continuous base stock must be applied or the excess adhesive must be removed prior to placement of the base labels or outserts thereon. If the adhesive is to be removed, then the outsert or base label placement must be coordinated as discussed above with regard to adhesive patches.

It is also desirable to increase the information carrying capacity and the useability of an outsert. Conventional unitary folded leaflets suffer from at least two major drawbacks: 1) the available space on the leaflet is constrained by printing press limitations (i.e., normally the leaflet can be no longer than 40 inches); and 2) users often dislike the leaflet because it is difficult to refold once opened, whether while still a part of the label or after separation from the label.

Thus, there exists a need for a method for forming pressure sensitive adhesive backed labels mounted on a release liner which does not require an adhesive applying station. Furthermore, there exists a need for such a label construction method wherein the bottom panel of an outsert becomes adhesive coated and is designed to remain with the associated package as a primary label when the remainder of the outsert is removed. There exists a need for an outsert having increased information carrying capacity and useability.

SUMMARY OF THE INVENTION

The present invention is directed to a pressure sensitive adhesive backed outsert and a method for forming the same. According to the present invention, the outserts are leaflets or booklets. The leaflets or booklets are temporarily affixed to what is known as "double coated tape", to adhesive transfer tape, or to a base web.

"Double coated tape", as used herein, includes a silicon release liner and a first layer of adhesive covered by a carrier which is in turn coated with a second adhesive layer. The first layer of adhesive is releasably mounted on the liner while the carrier is permanently coated on opposite sides by the first and second adhesive layers. Preferably, the carrier is a relatively thin polymeric film. Labels having varying advantages and characteristics may be formed by the following methods of forming labels utilizing the double coated tape as described above.

Labels according to a first embodiment may be formed by the following method. Outserts or the like are placed on the second, layer of adhesive. A layer of clear film laminate is then placed over the outsert and is secured to the tape along the portion of the second layer of adhesive not covered by the outserts. The construction is then die cut about the periphery of the outsert so that a border is formed adjacent to at least two sides of the outsert. The waste matrix is then removed. Because a laminate cover is provided, a non-coated and/or non-varnished printing stock may be used to form the outsert. Further, the laminate protects the booklet and provides greater integrity to the label.

Labels according to a second embodiment may be constructed by the following method. The unwound, double coated tape is die cut through the carrier and both layers of adhesive to the release liner to form patches of the size (or smaller) and shape of the object to be carried thereon, e.g., an outsert. The unwanted portion of the tape or the waste matrix is then removed from the liner. The outserts or the like are then placed on the patches.

Labels according to a third embodiment may be formed by the following method. A deadening agent (a substance which removes the adherent property of adhesive) is applied to the exposed adhesive such that a portion of adhesive remains exposed. The outserts are placed on the exposed portion of the second layer of adhesive. The tape is then die cut leaving a border around the outsert, through the two adhesive layers and carrier down to the liner and the waste matrix is removed. It will be appreciated that the "deadened" adhesive will not cause binding when the strip of labels is wound.

"Adhesive transfer tape", as used herein, includes a silicon release liner merely covered by an adhesive layer without a carrier or polymeric layer. The adhesive is releasable from the liner. Labels having varying advantages and characteristics may be formed by the following methods of forming labels using the transfer tape as described.

Labels according to a fourth embodiment may be formed by the following method. Outserts or the like are placed on the layer of adhesive. A layer of clear film laminate is then placed over the outsert and is secured to the tape along the portion of the layer of adhesive not covered by the outserts. The construction is then die cut about the periphery of the outsert so that a border is formed adjacent to at least two sides of the outsert. The waste matrix is then removed. Because a laminate cover is provided, a non-coated and/or non-varnished printing stock may be used to form the outsert. Further, the laminate protects the booklet and provides greater integrity to the label.

As an alternative to the preceding method, labels according to the fourth embodiment may be formed by the following method. First, the transfer tape is unwound from a roll. A multiple up booklet is then placed on the adhesive layer. A clear laminate having adhesive on the side facing the transfer tape is then applied over the transfer tape and the multiple up booklets. The laminate and booklets are then face cut down to the release liner, creating two or more side-by-side individual outserts from each multiple up booklet. The waste matrix including the adhesive between the individual outserts and the outsert waste portion between the individual outserts is then removed by pulling up the clear laminate.

Labels according to a fifth embodiment may be formed by the following method. The transfer tape is unwound and outserts or the like are placed thereon. Multiple outsert applying magazines may be used. A non-adhesive laminate is placed over the web and the outserts, and the construction is passed through a nip roller. The laminate, along with the adhesive not covered by the outsert, is then removed.

As an alternative to the preceding method, labels according to the fifth embodiment may be formed by the following method. First, the transfer tape web is unwound and multiple up booklets are placed thereon. The multiple up booklets are then face cut, creating the foot print of the individual outserts and the respective labels. Next, a second web of clear laminate material having no adhesive is unwound. The clear laminate is run through a print station which applies a band of adhesive in the web direction. The bands are sized and configured to run between each of the individual outserts, being approximately the same width as the outsert waste portions. Next, the clear laminate material with the adhesive bands is laminated to the transfer tape and outserts. The laminate material is removed. Removal of the laminate material pulls up the exposed adhesive between the multiple outserts and pulls away the waste material between the parts of the multiple up respective outserts.

Labels according to a sixth embodiment may be formed by the following method. A deadening agent is applied to the exposed adhesive such that a portion of adhesive remains exposed. The outserts are placed on the exposed portion of the layer of adhesive. It will be appreciated that the "deadened" adhesive will not cause binding when the strip of labels is wound.

As an alternative to the preceding method, labels according to the sixth embodiment may be formed by the following method. First, adhesive deadener is applied to the unwound transfer tape web at areas where no booklets are to be applied. Next, multiple up booklets are placed on the web. The multiple up booklets are then face cut to the release liner to form individual outserts. Bands of adhesive are applied to a clear laminate material and the laminate material is then laminated to the transfer tape. Thereafter, the laminate material is removed, taking up the outsert waste portions therewith.

The present invention is further directed to labels formed in each of the configurations and according to each of the methods as described above and including booklets as the outsert. Preferably, the booklet has a bottom panel which is provided with a tear line. The bottom panel is secured to the upper most adhesive layer of the double coated tape or transfer tape. The booklet may be removed from the remainder of the label by tearing along the aforementioned tear line.

The present invention is further directed to a label product including a web of transfer tape, the web including a release liner having an upper surface and a layer of adhesive thereon. A plurality of booklets are affixed at spaced positions along the web. Each of the booklets has a bottom panel. The adhesive layer is interposed between the upper surface and each of the booklets. Each of the booklets is releasably secured to the upper surface of the release liner by the adhesive layer.

The label product may include a laminate cover covering each of the booklets and secured to the upper surface of the release liner by the adhesive layer. The label product may further include a tear line formed in the laminate cover. The laminate is preferably secured to the adhesive layer by a border of adhesive formed about each of the booklets. Alternatively, the label product may include a border including adhesive deadener formed about each of the booklets. As a further alternative, the label product may be formed such that substantially all of the adhesive layer is covered by the booklets.

Preferably, each of the booklets includes a tear line along the bottom panel such that a remaining portion of the booklet may be removed from the adhesive layer. Moreover, a laminate cover may be provided covering each of the booklets and secured to the upper surface of the release liner by the adhesive layer. A tear line is preferably formed in the laminate cover adjacent the tear line in the bottom panel. A second tear line may be formed in the laminate cover adjacent an edge of the booklet opposite the tear line in the bottom panel. Alternatively, a tear line may be formed in the laminate cover adjacent an edge of the booklet opposite the tear line in the bottom panel without provision of a tear line in the laminate cover adjacent the tear line in the bottom panel.

The present invention is further directed to a label product including a web of double coated tape. The web includes a carrier formed from a polymeric film having a thickness of between 0.5 mil and 4.5 mils and an upper surface and a lower surface, a release liner having an upper surface, the lower surface of the carrier coated with a first adhesive layer and the upper surface of the carrier coated with a second adhesive layer, the carrier releasably secured to the upper surface of the release liner by the first adhesive layer. A plurality of booklets are affixed at spaced positions along the web, each of the booklets having a bottom panel. The booklets are secured to the upper surface of the carrier by the second adhesive layer.

The label product including a double coated tape web may include a laminate cover covering each of the booklets and secured to the upper surface of the release liner by the adhesive layer. The label product may further include a tear line formed in the laminate cover. The laminate is preferably secured to the adhesive layer by a border of adhesive formed about each of the booklets. Alternatively, the label product may include a border including adhesive deadener formed about each of the booklets. As a further alternative, the label product may be formed such that substantially all of the adhesive layer is covered by the booklets.

Preferably, each of the booklets includes a tear line along the bottom panel such that a remaining portion of the booklet may be removed from the adhesive layer. Moreover, a laminate cover may be provided covering each of the booklets and secured to the upper surface of the release liner by the adhesive layer. A tear line is preferably formed in the laminate cover adjacent the tear line in the bottom panel. A second tear line may be formed in the laminate cover adjacent an edge of the booklet opposite the tear line in the bottom panel. Alternatively, a tear line may be formed in the laminate cover adjacent an edge of the booklet opposite the tear line in the bottom panel without provision of a tear line in the laminate cover adjacent the tear line in the bottom panel.

The present invention is further directed to a booklet for displaying information. The booklet includes an outer piece and an inner piece. The outer piece includes a top panel and a bottom panel joined by an outer fold. The inner piece is disposed between the top and bottom panels and has a pair of interior panels joined by an inner fold. Attaching means couple the outer and inner pieces to one another at the outer and inner folds. A tear line is formed in the bottom panel adjacent the outer fold.

In one embodiment, the bottom panel includes an extended flap extending beyond adjacent respective edges of the top and interior panels. Further, the extended flap may include an inner extended flap portion and an outer extended flap portion, the inner extended flap portion having a release varnish coating on an upper surface thereof.

In an alternative embodiment, the top panel includes an extended flap extending beyond adjacent respective edges of the bottom and interior panels. The extended flap may include an inner extended flap portion and an outer extended flap portion with a second tear line formed in the inner extended flap portion. Further, title indicia may be disposed on an upper surface of the top panel with primary indicia disposed on an upper surface of the outer extended flap portion.

In a further alternative embodiment, the bottom panel includes a first extended flap extending beyond adjacent respective edges of the top and interior panels, the first extended flap including an inner extended flap portion and an outer extended flap portion. The top panel includes a second extended flap extending beyond the adjacent respective edges of the interior panels and overlying the inner extended flap portion of the first extended flap. Preferably, a second tear line is formed in the second extended flap.

In a further alternative embodiment, the top panel includes a first extended flap extending beyond adjacent respective edges of the bottom and interior panels, the first extended flap including an inner extended flap portion. The bottom panel includes a second extended flap extending beyond the adjacent respective edges of the interior panels and underlying the inner extended flap portion of the first extended flap. Preferably, a second tear line is formed in the inner extended flap portion. Further, title indicia may be disposed on an upper surface of the top panel with primary indicia disposed on an upper surface of the outer extended flap portion.

In a further alternative embodiment, the top panel includes a first extended flap and the bottom panel includes a second extended flap, each of the first and second extended flaps extending beyond adjacent respective edges of the interior panels. The first and second extended flaps are releasably secured to one another by adhesive. Preferably, the first and second extended flaps are of substantially the same length.

The present invention is further directed to a label product including a release liner having an upper surface and a booklet as described above disposed on the upper surface of the release liner. That is, the booklet includes an outer piece including a top panel and a bottom panel joined by an outer fold, an inner piece disposed between the top and bottom panels having a pair of interior panels joined by an inner fold, attaching means coupling the outer and inner pieces to one another at the outer and inner folds, and a tear line formed in the bottom panel adjacent the outer fold. A layer of adhesive is interposed between the bottom panel and the upper surface of the release liner.

In some embodiments, the label product as just described includes an adhesive patch interposed between the booklet and the upper surface. The adhesive patch includes a carrier formed from a polymeric film having a thickness of between 0.5 mil and 4.5 mil and an upper surface and a lower surface, the lower surface coated with the first adhesive layer such that the carrier is releasably secured to the upper surface of the release liner thereby, the upper surface of the carrier coated with a second adhesive layer. The bottom panel is substantially permanently secured to the carrier by the second adhesive layer. Preferably, an area of adhesive deadener is disposed between the booklet and the second adhesive layer and underlying the outer fold.

Alternatively, in some embodiments the label product includes a base portion having an upper surface and a lower surface and interposed between the release liner and the booklet. The lower surface is releasably adhered to the upper surface of the release liner by the first adhesive layer and the bottom panel is substantially permanently adhered to the upper surface of the base portion by a second adhesive layer.

Alternatively, in some embodiments the bottom panel is directly adhered to the upper surface of the release liner by the adhesive layer. Again, an area of adhesive deadener is preferably disposed between the booklet and the adhesive layer and underlying the outer fold.

The label products including a booklet as described above may be formed according to certain more particular embodiments as described below.

In a seventh and other embodiments of the label product, a laminate cover covers the booklet. The laminate cover includes a marginal portion extending adjacent the inner and outer folds and coated on a lower surface thereof by the adhesive layer. The laminate cover further includes a laminate tear line formed in the marginal portion such that a portion of the laminate cover overlying the booklet may be separated from the marginal portion by tearing along the laminate tear line.

In an eighth embodiment of a label product including a booklet as described, the bottom panel includes an extended flap extending beyond adjacent respective edges of the top and interior panels and further includes a laminate cover covering the booklet and adhered by a second adhesive layer to an upper surface of the extended flap. Preferably, the extended flap includes an inner extended flap portion and an outer extended flap portion, the inner extended flap portion having a release varnish coating an upper surface thereof, and further includes a tear line formed in the laminate cover and overlying the release varnish.

In a ninth embodiment, the top panel includes an extended flap extending beyond adjacent respective edges of the bottom and interior panels, the adhesive layer interposed between the extended flap and the upper surface of the release liner. Preferably, the extended flap includes an inner extended flap portion and an outer extended flap portion, and further includes a second tear line formed in the inner extended flap portion. More preferably, title indicia is disposed on an upper surface of the top panel and primary indicia is disposed on an upper surface of the outer extended flap portion.

In a tenth embodiment, the bottom panel includes a first extended flap extending beyond adjacent respective edges of the top and interior panels. The first extended flap includes an inner extended flap portion and an outer extended flap portion. At least one of the top panel and the interior panels includes a second extended flap extending beyond the other adjacent respective edges and overlying the inner extended flap portion of the first extended flap, and further includes a laminate cover covering the booklet and adhered by a second adhesive layer to an upper surface of the outer extended flap portion. Preferably, a second tear line is formed in the second extended flap and a laminate tear line is formed in the laminate cover and overlying the second extended flap.

In an eleventh embodiment, the top panel includes a first extended flap extending beyond adjacent respective edges of the bottom and interior panels. The first extended flap includes an inner extended flap portion and an outer extended flap portion. At least one of the bottom panel and the interior panels includes a second extended flap extending beyond the other adjacent respective edges and underlying the inner extended flap portion of the first extended flap, the adhesive layer interposed between the extended flap and the upper surface of the release liner. Preferably, a second tear line is formed in the inner extended flap portion. More preferably, title indicia is disposed on an upper surface of the top panel and primary indicia is disposed on an upper surface of the outer extended flap portion.

In a twelfth embodiment, the top panel includes a first extended flap and the bottom panel includes a second extended flap, each of the first and second extended flaps extending beyond adjacent respective edges of the interior panels. The first and second extended flaps are releasably secured to one another by a booklet adhesive. The label product may further include a laminate cover covering the booklet and having a marginal portion extending adjacent the first and second extended flaps. The first adhesive layer is interposed between the marginal portion and the upper surface of the release liner. Preferably, a laminate tear line is formed in the laminate cover adjacent the first and second extended flaps. The label product may include a laminate cover covering the booklet and adhered to at least a portion of an upper surface of the top panel by a laminate adhesive. The first and second extended flaps are preferably substantially coextensive.

The present invention is further directed to a booklet having a tear line formed in a top panel thereof. More particularly, the booklet includes a bottom panel, a top panel, a first interior panel, and at least one second interior panel. The top panel has first and second opposed ends and overlies the bottom panel. The first end of the top panel is connected with the bottom panel along a first fold. The first interior panel is disposed between the bottom panel and the top panel. The first interior panel is connected with the second end of the top panel along a second fold. One or more second interior panels are disposed between the bottom panel and the top panel. Attaching means couple the second interior panel or panels with the first interior panel at the second fold.

The booklet as just described may be formed such that at least one of the first and second interior panels includes a free edge opposite the second fold. Moreover, each of the bottom panel and the top panel may include a marginal portion extending between the first fold and at least one of the first and second interior panels. A tear line may be formed in the top panel in the marginal portion thereof. Further, the bottom panel may include an extended flap extending adjacent and beyond the second fold.

The present invention is further directed to a label product incorporating a booklet as just described. The booklet may be applied to various adhesive patches or base portions as described above. Preferably, the label product includes a laminate cover overlying the top panel of the booklet. The laminate cover may include a laminate tear line overlying a tear line formed in the top panel of the booklet. The laminate cover may further include a second tear line adjacent the second fold of the booklet. Moreover, the laminate cover may be adhered by a second adhesive layer to an upper surface of an extended flap forming a part of the base panel of the booklet.

It is an object of the present invention to provide a label of the type including an outsert or leaflet having a pressure sensitive adhesive backing.

It is another object of the present invention to provide a label of the type described which creates a unitary construction which carries both the primary label and the information normally carried separately on an insert or outsert.

It is an object of the present invention to provide a method for forming a label as described above.

It is an object of the present invention to provide a label as described above, which does not require the application of adhesive to the label or the leaflet.

It is an object of the present invention to provide a method as described above which is cost effective and convenient.

It is an object of the present invention to provide a label as described above which may also include a laminate cover and a method for forming the same.

It is an object of the present invention to provide an outsert which has increased information carrying capacity as compared to conventional leaflet designs.

It is an object of the present invention to provide an outsert which has improved useability and handling characteristics as compared to conventional leaflet designs.

BRIEF DESCRIPTION OF THE DRAWINGS

FIG. 1 is a perspective view of a first embodiment according to the present invention.

FIG. 2 is a side elevational view of a section of the double coated tape of the present invention.

FIG. 3 is a perspective of a typical type of outsert intended for use in the preferred embodiment of the present invention.

FIG. 25 is a perspective view of a tenth embodiment according to the present invention.

FIG. 26 is a plan view of a booklet blank for forming a booklet for incorporation in a label of the tenth embodiment.

DETAILED DESCRIPTION OF THE INVENTION

As used herein, the term "outsert" means any type of outsert, leaflet, sheet, or the like for carrying information thereon and/or serving as a primary label. As discussed below with regard to the seventh through thirteenth embodiments, the outserts may take the form of booklets of varying designs.

A unique aspect of the present invention resides in the use of the double coated tape 40 or, in the alternative, adhesive transfer tape 540 to which the outserts or leaflets are affixed and the manner in which the labels are produced.

Figure 5:
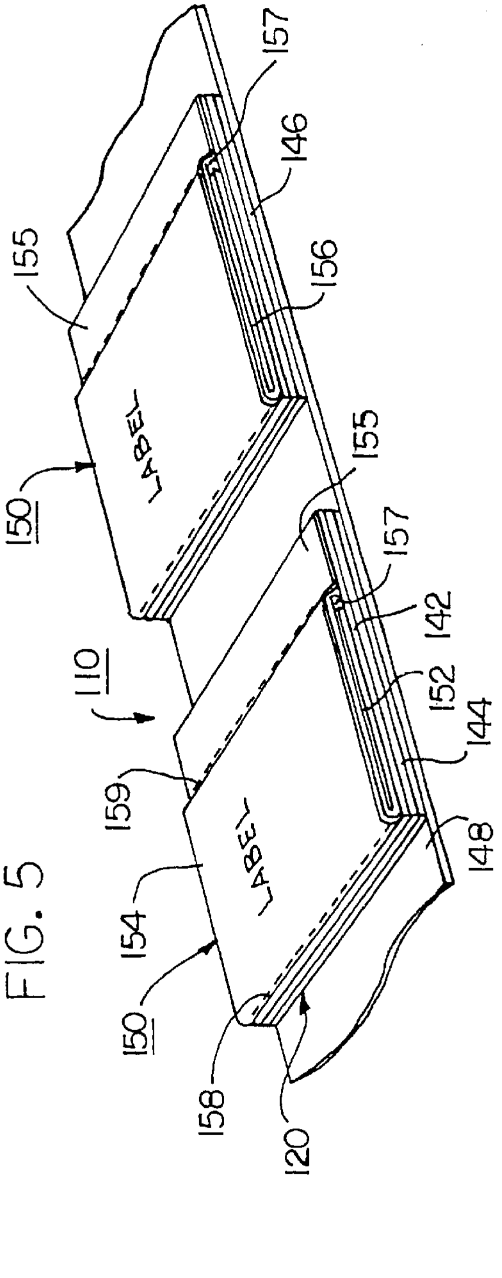
FIG. 5 is a perspective view of a second embodiment of the present invention.
Figure 7:
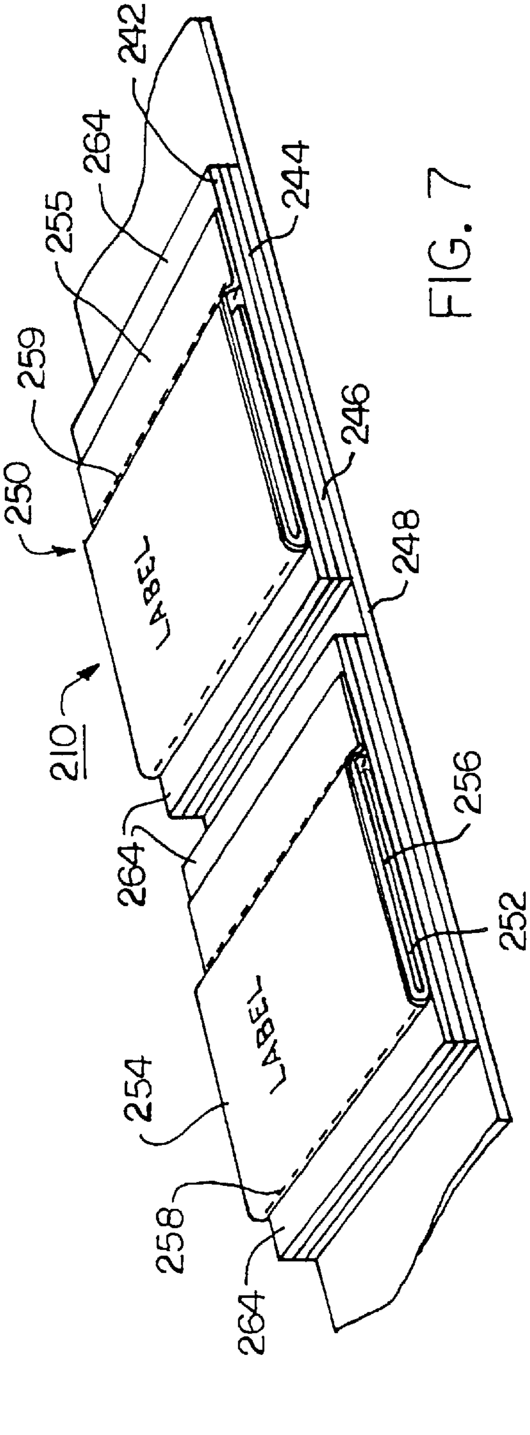
FIG. 7 is a perspective view of a third embodiment according to the present invention.

Referring now to FIGS. 1, 5, and 7, first, second, and third embodiments of the present invention, respectively, are shown therein, each being formed from double coated tape. Label 10 of FIG. 1 includes a film laminate cover. Label 110 of FIG. 5 is unlaminated and is formed without a border surrounding the outsert. Label 210 of FIG. 7 is likewise unlaminated but includes a border 264 surrounding the outsert in which the adhesive has been removed.

The double coated tape 40 is best seen in FIG. 2. Tape 40 includes liner 48, adhesive layer 46, carrier 44, and second adhesive layer 42. Adhesive layers 46, 42 are preferably formed from pressure sensitive adhesive. Carrier 44 is preferably formed from a polypropylene substrate having a thickness of between 0.5 mil (0.0005 inch) and 4.5 mils (0.0045 inch). Double coated tape as described may be formed by applying a pressure sensitive adhesive coating to the upper surface of a self adhesive polypropylene substrate disposed on a release liner, such as 3M Scotch Brand Tape product number 7214 FL 2 mil polypropylene. Double coated tapes having a second release liner layer located on second adhesive layer 42 may also be used. Double coated tapes having carriers formed from polyester, polystyrene, polyethylene or other polyolefins may be used as well. A suitable product having a polyester carrier is Flexcon Flexmark product number DFM-100-CLEAR V-23/70 D/Fk. Note that the relative size of the tape and thickness of the layers has been exaggerated in the drawings for the sake of clarity. Preferably, layers 42, 44, 46 which remain with label 10 when the same is removed from liner 48 will appear as a thin adhesive film on the lower surface of bottom panel 56.

Referring now to FIGS. 1–4 in general and to FIG. 1 in particular, a first and preferred embodiment of the label of the present invention, generally denoted 10, is shown therein. Label 10 includes a supporting patch 22 formed from the polypropylene layer 44, which is releasably secured to release liner 48, and outsert 50 which is secured to the top of patch 22. Laminate cover 60 covers both outsert 50 and its support patch 22.

Outsert 50, as best seen in FIG. 3, is preferably of the type disclosed in U.S. Pat. No. 5,263,743. However, it will be appreciated that other types of outserts, leaflets, sheets and the like may be used. Outsert 50 includes bottom panel 56, title panel 54, marginal edge portion 55, and intermediate panels 52. Tear lines 57 and 58 are provided between bottom panel 56 and panels 52 and 54, respectively. Tear line 59 is provided between panel 54 and marginal edge portion 55. Bottom panel 56 and the inner surface of marginal edge portion 55 are adhered to second adhesive layer 42. Depending on the application, outserts may be used which do not have marginal edge portion 55 and/or one or more of tear lines 59, 58, and 57. If marginal edge portion 55 is not used, it may be preferable to apply adhesive between the underside of panel 54 and the mating surface of panel 52. Statutory information may be printed on panels 54, 56, or borders 62, 264 (as described below) and/or the laminate cover.

Patch 22 is somewhat larger than outsert 50, thereby forming borders 62. Film layer 60 is formed by a preferably clear film secured to patch 22 along the peripheral portion of second adhesive layer 42 located in borders 62. Preferably, laminate 60 does not have adhesive on its inner surface so that it covers outsert 50 without adhering to the same. Laminate 60 serves to protect outsert 50 from damage during handling of the package. Laminate 60 is provided with a perforation 61 to facilitate access to the outsert.

Label 10 according to the first embodiment may be constructed as follows and with reference to FIG. 4. A continuous strip of tape 40 is removed from a roll, or unwinding station 340 as described above such that second adhesive layer 42 faces upwardly. A succession of outserts 50 are fed from a supply hopper or outsert applying station 350 at spaced intervals along tape 40. Station 350 preferably applies outserts in response to photodetector 352 whose eye senses marks previously printed on the release liner. These marks may be printed after the roll is unwound using a printing station (not shown). A continuous layer of film 60 is fed from a supply roll or laminate applying station 360 over second adhesive layer 42 and outserts 50. It will be appreciated that laminate 60 will be adhered to the portion of adhesive layer 42 not covered by an outsert 50. Tape 40, laminate 60, and outsert 50 are then passed through nip rollers 362 to secure the assembly. A die cutter 370 forms perforation 61 in laminate 60 and a cut line framing each outsert. Perforation 61 goes only through the lamination. The cut line extends down through both adhesive layers 42, 46 and through carrier 44 to release liner 48. The cut line is preferably spaced from the edges of outsert 50 such that borders 62 are formed on two sides. Following the cutting operation, the resulting waste matrix 80 (i.e., those portions of layers 42, 44, 46, 50 and 60 not within the periphery of the cut lines) is removed from the construction at removal station 380. Upon removal of the waste matrix, labels 10 remain on release liner 48. The release liner and labels may be wound onto a take-up roll or winding station 390 or fan folded into a stack. The finished web may be slit longitudinally if desired, for example, to form a four wide or "four-up" label roll into four separate label rolls. It will be appreciated that because all of second adhesive layer 42 has been either removed or covered by laminate 60, the liner and labels may be subsequently unwound for use without binding. It will be appreciated from the foregoing that the method as described allows a margin of error for placement of the outsert and location of the die cut.

A label 110 according to a second embodiment of the present invention, best seen in FIG. 5, is formed without the use of a laminate cover. The numerals 158, 154, 150, 159, 155, 146, 144, 142, 152, 156, 148 and 157 indicate elements which correspond to elements 58, 54, 50, 59, 55, 46, 44, 42, 52, 56, 48, and 57, respectively, of the first embodiment. Label 110 includes a patch 120 identical to patch 22 of the first embodiment except that patch 120 is sized and shaped to fit at or within the periphery of outsert 150. It will be appreciated that because outsert 150 covers all of the second adhesive layer 142 of patch 120, the liner and labels may be rolled and unrolled without binding.

Labels 110 of the second embodiment may be constructed as follows and with reference to FIG. 6. Tape 140 is unwound from a roll at unwinding station 440. Tape 140 is die cut at cutting station 470 down to liner 148 and in the shape of patches 120. The resulting waste matrix 182 is then removed at removal station 480, leaving patches 120 on liner 148. As patches 120 pass under outsert applying station 450, outserts 150 are successively placed thereon whereby they are adhered to second adhesive layer 142. Resultant labels 110 may then be wound onto a roll by winding station 490. The order of steps as described above is preferred because it requires less exact placement of the cut lines. That is, patch 120 may be cut smaller than the area of outsert 150 to allow for error in the placement of outsert 150.

Labels 210 according to a third embodiment of the present invention, as best seen in FIG. 7, may be formed without a laminate cover while still providing a patch 222 which extends beyond the periphery of outsert 250. The numbers 258, 254, 250, 259, 255, 256, 242, 244, 246, 248, 252, and 222 indicate elements which correspond to elements 58, 54, 50, 59, 55, 56, 42, 44, 46, 48, 52 and 22, respectively, of the first embodiment. Label 210 includes patch 222 which is larger than outsert 250 such that borders 264 extend beyond the edges of outsert 50. The portions of second adhesive layer 242 which make up borders 264 are treated with a deadening agent such that they are no longer adherent. Deadening agents suitable for this purpose include product number FM1512 from K&W Printing, Inc., of Franklin Park, Ill. It will be appreciated that labels 210 mounted on release liner 248 may be rolled and unrolled without binding because no adherent adhesive is exposed.

Labels 210 according to the third embodiment may be formed as follows and with reference to FIG. 8. A continuous strip of tape 240 is unwound from a supply roll at unwinding station 540. A deadening agent is applied onto the construction by coating station 595 such that a portion of non-deadened adhesive remains exposed. Outserts 250 are then successively applied to the non-deadened adhesive on the upper surface of tape 240 at outsert applying station 550. At cutting station 570 die cuts are formed around each outsert 250 down to liner 248 such that borders 264 are formed thereabout. Alternatively, the cutting step may take place prior to the application of the outsert. The resultant waste matrix 280 is removed at removal station 580. The resulting labels 210 and liner 248 may then be rolled onto a roll by winding station 590. It will be appreciated from the foregoing that the method as described provides a margin of error for locating the outserts and the cut lines.

It will be appreciated that in each of the methods described above, if a double coated tape of the type having a second release liner is used, the second liner will be removed as a part of the unwinding step.

In each of the above-described methods, a plurality of individual outserts may be placed across the web using a corresponding number of outsert applying stations (not shown) spaced across the web. The web may thereafter be slit into individual webs, each having labels thereon.

Figure 13:
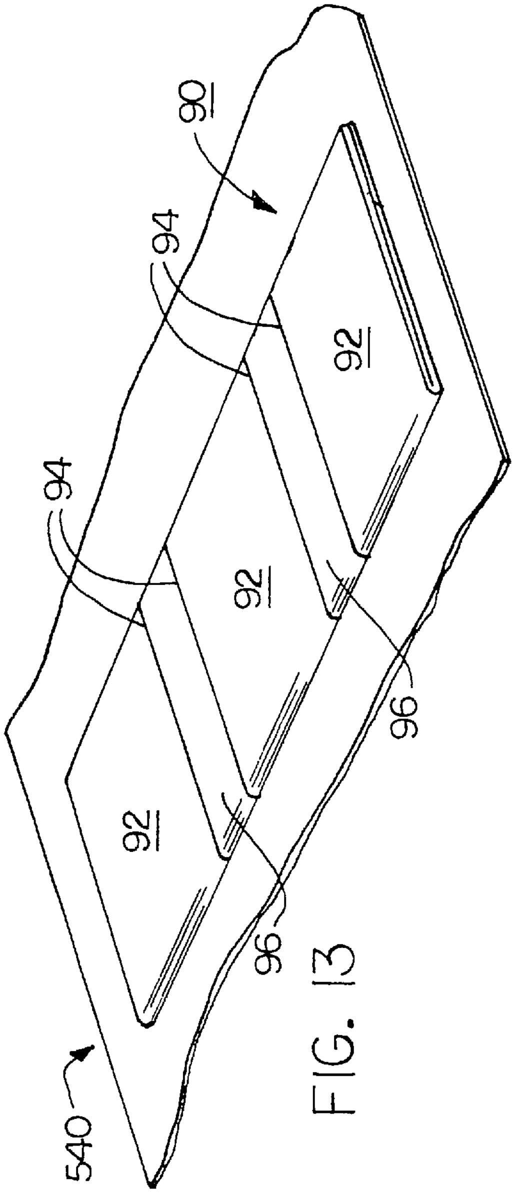
FIG. 13 is a perspective view of a web of adhesive transfer tape with a multiple up booklet placed on the upper surface thereof.

"Multiple up" booklets 90, as shown in FIG. 13, for example, are booklets which may be placed on the double coated tape, and subsequently cut into more than one complete individual outsert 92 such that a plurality of individual outserts will then extend across the web, which may or may not thereafter be slit into individual webs. Each outsert 92 will be substantially identical to outserts 50, 150, 250 as described above. Typically, a margin of about one-half inch is provided between individual outserts 92 so that, once the multiple up booklet is cut, there remain one or more waste portions of outsert material 96 between cut lines 94 that must be removed along with the other waste matrix materials. In each of the above-described methods, if multiple up booklets are used, the outsert waste portions will be removed along with the other waste matrix without further provision because of the construction of the double coated tape. More specifically, the outsert waste portions are disposed outside the die cut region of the labels. As the waste matrix is removed, the outsert waste portions 96 are pulled away from underneath by the adhesive and carrier layers which form a continuous substrate thereunder. That is, as the adjacent portions of the carrier and adhesive layers are pulled up, the portion beneath the outsert waste portion comes up as well, bringing the outsert waste portion with it.

Figure 8:
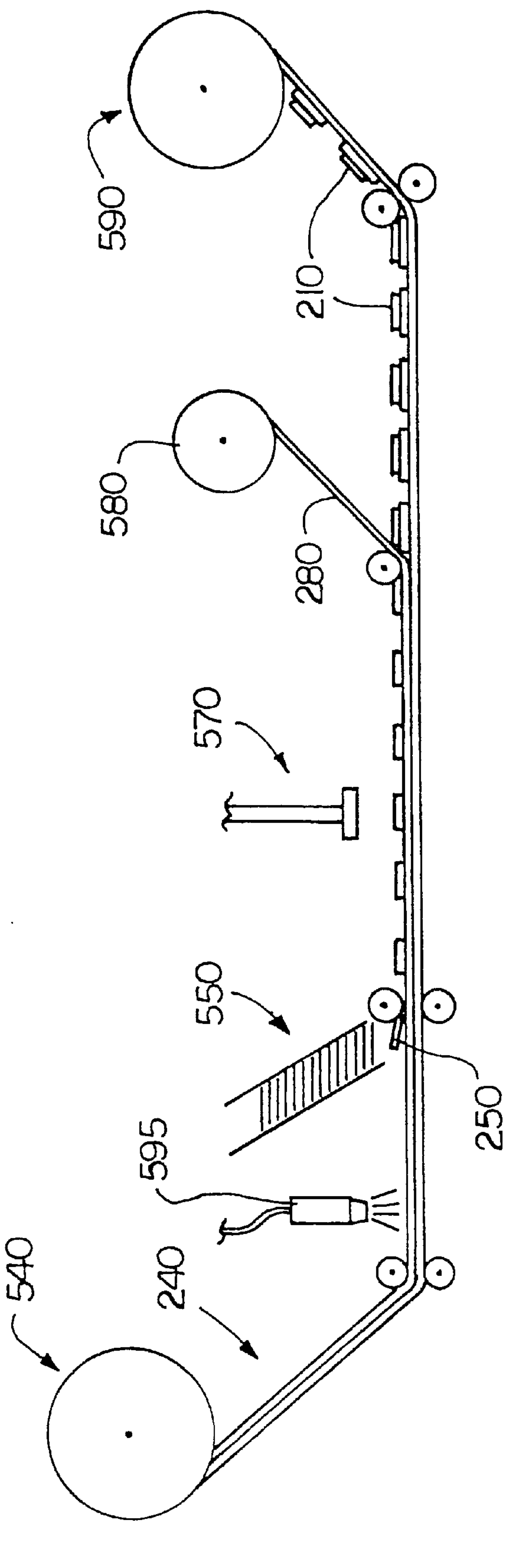
FIG. 8 is a diagrammatic side elevational view of an apparatus adapted to produce the labels of FIG. 7.
Figure 9:
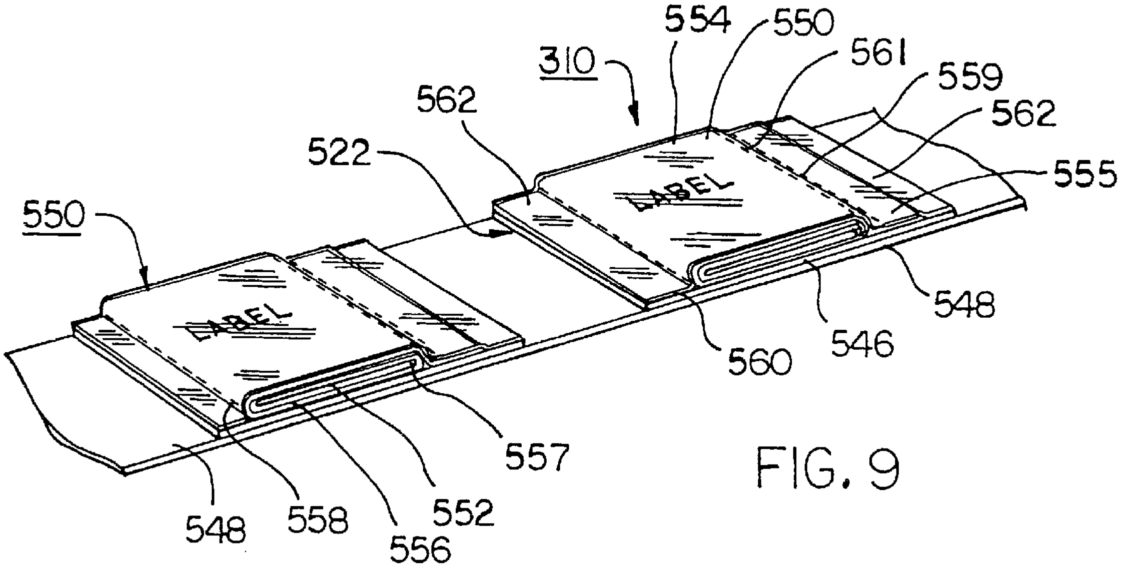
FIG. 9 is a perspective view of a fourth embodiment according to the present invention.
Figure 11:
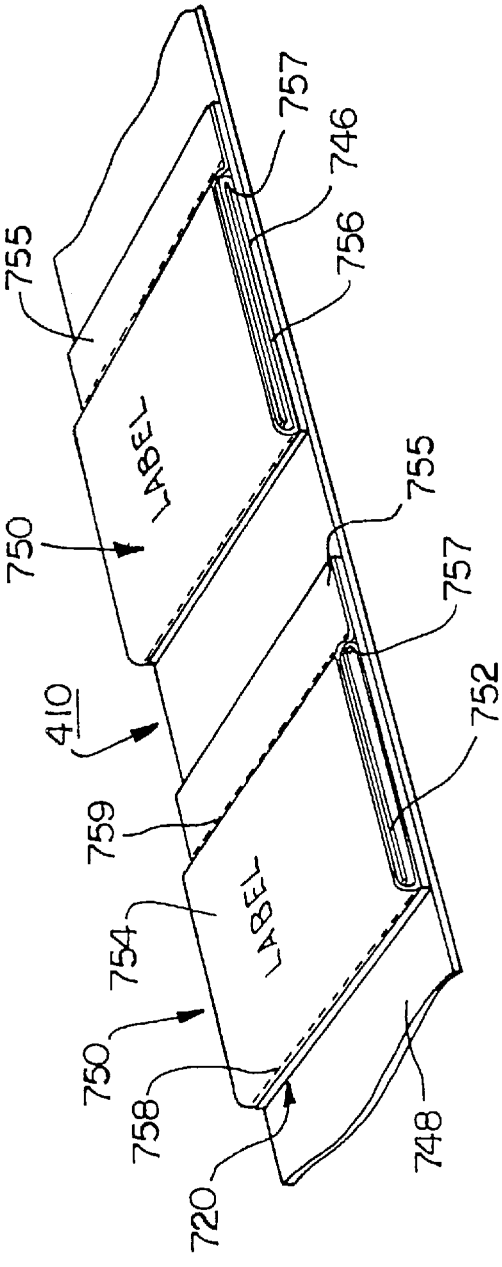
FIG. 11 is a perspective view of a fifth embodiment of the present invention.
Figure 12:
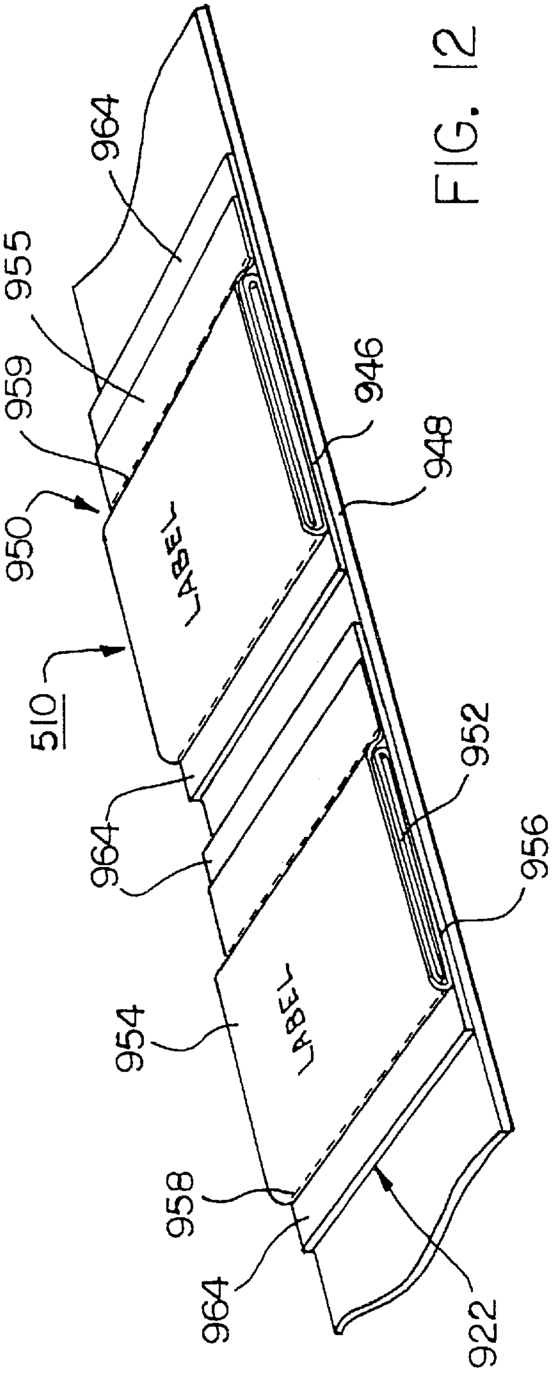
FIG. 12 is a perspective view of a sixth embodiment according to the present invention.

Referring now to FIGS. 9, 11, and 12, fourth, fifth, and sixth embodiments of the present invention, respectively, are shown therein, each being formed from adhesive transfer tape rather than the double coated tape of FIGS. 1–8. Label 310 of FIG. 9 includes a film laminate cover. Label 410 of FIG. 11 is unlaminated and is formed without a border surrounding the outsert. Label 510 of FIG. 12 is likewise unlaminated but includes a border 964 surrounding the outsert in which the adhesive has been removed.

Figure 10:
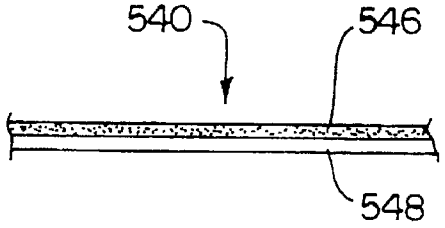
FIG. 10 is a side elevational view of a section of the adhesive transfer tape of the present invention.

The transfer tape 540 is best seen in FIG. 10. Tape 540 includes liner 548 and adhesive layer 546. Preferably, liner 548 includes a silicon coating on both sides. Adhesive layer 546 is preferably formed from pressure sensitive adhesive. Transfer tape such as 3M Product #9447, 1 millimeter high tenacity tape with 320 adhesive is exemplary of one product which may be used. Transfer tapes having a second release liner layer located on adhesive layer 546 may also be used. Note that the relative size of the tape and thickness of the adhesive layer have been exaggerated in the drawings for the sake of clarity. Preferably, layer 546 which remains with label 310 when the same is removed from liner 548 will appear as a thin adhesive film on the lower surface of the bottom panel of the outsert.

Referring now to FIGS. 9 and 10 in general and to FIG. 9 in particular, a fourth embodiment of the label of the present invention, generally denoted 310, is shown therein. The numerals 558, 554, 550, 559, 555, 552, 556, and 557 indicate elements which correspond to elements 58, 54, 50, 59, 55, 52, 56, and 57 of the first embodiment, respectively. Label 310 includes a supporting patch 522 formed from adhesive 546 which is releasably secured to release liner 548, and outsert 550 which is secured to the top of patch 522. Laminate cover 560 covers both outsert 550 and its support patch 522.

Patch 522 is somewhat larger than outsert 550, thereby forming borders 562. Film layer 560 is formed by a preferably clear film secured to patch 522 along the peripheral portion of adhesive layer 546 located in borders 562. Film layer 560 preferably includes adhesive on its inner surface. Laminate 560 serves to protect outsert 550 from damage during handling of the package. Laminate 560 is provided with a perforation 561 to facilitate access to the outsert. Preferably, laminate 560 has a thickness in the range of 2–3 mil to facilitate application of labels 310 from the release liner to packages. The increased thickness helps to reduce buckling of the laminate due to the thickness of the outsert and the large amount of adhesive present on the transfer tape.

Figure 4:
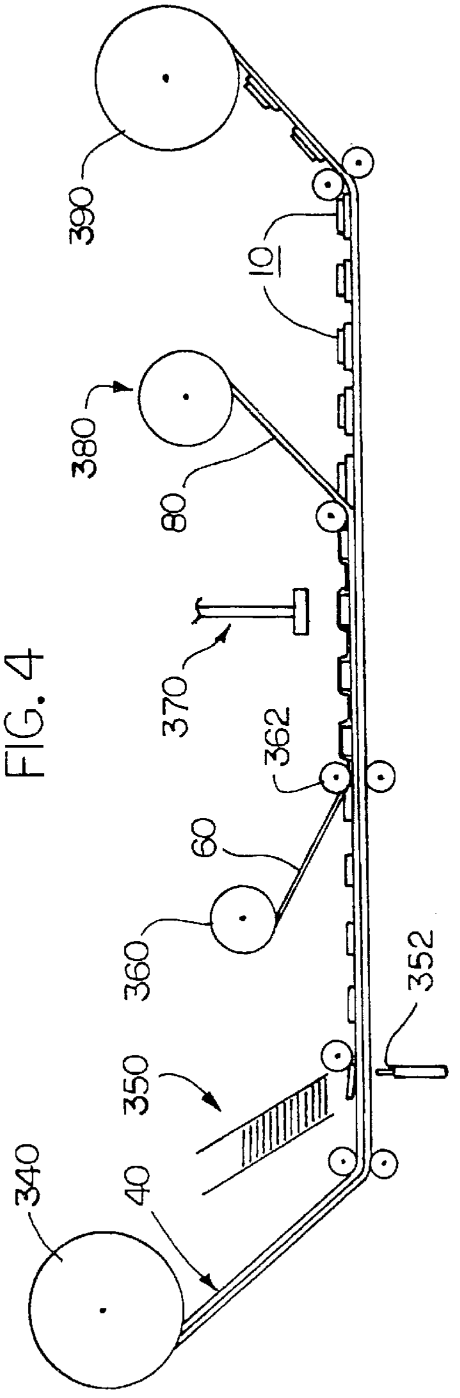
FIG. 4 is a diagrammatic side elevational view of an apparatus adapted to produce the labels of FIGS. 1–3.

Label 310 according to the fourth embodiment may be constructed using the same apparatus as used to construct label 10 as shown in FIG. 4, and by the same method except that tape 540 is substituted for double coated tape 40. In this case the cut line formed by die cutter 570 extends down through adhesive layer 546 to release liner 548. Similarly, the release liner and labels may be wound onto take-up roller winding station 390 or fan folded into a stack. Multiple individual outserts may be placed across the web by multiple outsert applying stations (not shown) spaced across the web. The web may thereafter be slit into a plurality of individual webs having labels thereon. It will be appreciated that because all of adhesive layer 546 has been either removed or covered by laminate 560, the liner and labels may be subsequently unwound for use without binding. Again, it will be appreciated that the method as described allows a margin of error for placement of the outsert and location of the die cut.

If multiple up booklets 90, as best seen in FIG. 13, are used to produce labels according to the fourth, fifth, or sixth embodiments (discussed below) removal of the outsert waste portion 96 (the margin of booklet material between respective individual outserts) will be more difficult. This is because the transfer tape lacks the carrier layer and the integrity provided thereby which aided in the removal of this waste in the production of labels according to the first, second, and third embodiments. With this draw-back of transfer tape in mind, the following method may be used for forming labels according to the fourth embodiment using multiple up booklets.

Figure 14:
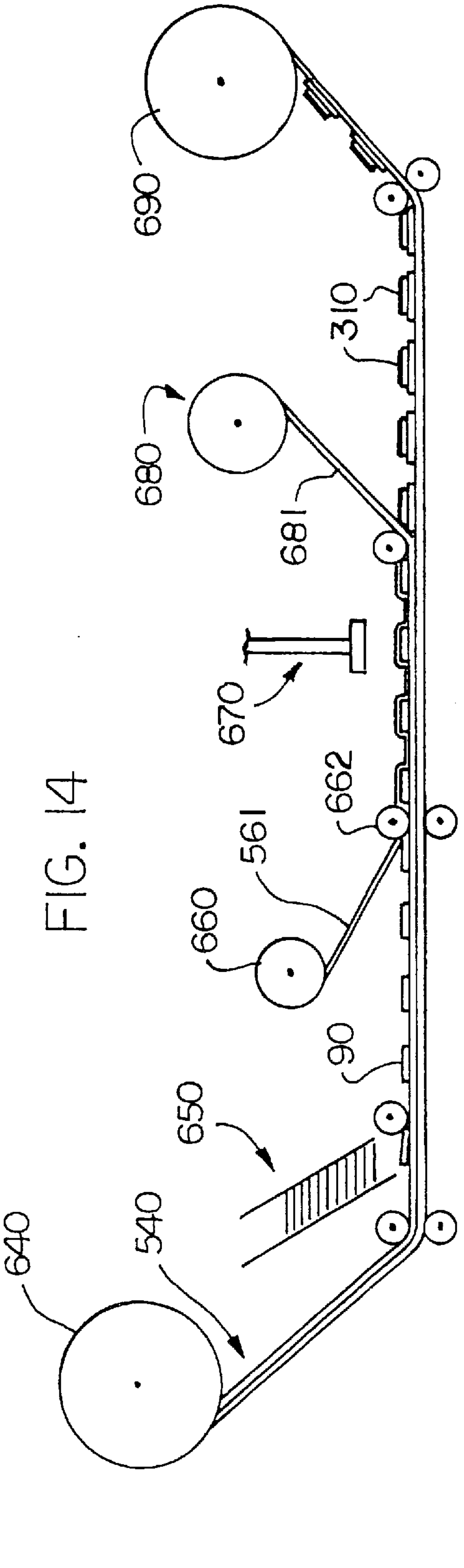
FIG. 14 is a diagrammatic side elevational view of an apparatus adapted to produce the labels of FIG. 9 using multiple up booklets.

With reference to FIGS. 13 and 14, labels 310 according to the fourth embodiment may be formed by first unwinding the transfer tape 540 from unwinding station 640. A multiple up booklet 90 is then placed on the adhesive layer by booklet applying station 650. A clear laminate 561 having adhesive on the side facing the transfer tape is then applied by laminate unwind station 660 over the transfer tape and the multiple up booklets. Tape 540, booklets 90, and laminate 561 are then passed through nip rollers 662. The laminate and booklets are face cut down to the release liner by die cutter 670, creating two or more side-by-side individual outserts 92 from each multiple up booklet. The waste matrix 681 including the adhesive between the individual outserts and the outsert waste portion between the individual outserts is then removed by rewinding station 680. Labels 310 may then be wound onto a take-up roll by winding station 690. Optionally, the web may be slit into a plurality of webs having labels thereon prior to winding.

A label 410 according to a fifth embodiment of the present invention, best seen in FIG. 11, is formed without the use of a laminate cover. The numerals 758, 754, 750, 759, 755, 746, 756, 748, and 757 indicate elements which correspond to elements 558, 554, 550, 559, 555, 546, 552, 556, 548, and 559, respectively, of the fourth embodiment. Label 410 includes a patch 720 identical to patch 522 of the fourth embodiment except that patch 720 is sized and shaped to fit at or within the periphery of outsert 750. It will be appreciated that because outsert 750 covers all of the adhesive layer 746 of patch 720, the liner and labels may be rolled and unrolled without binding.

Figure 6:
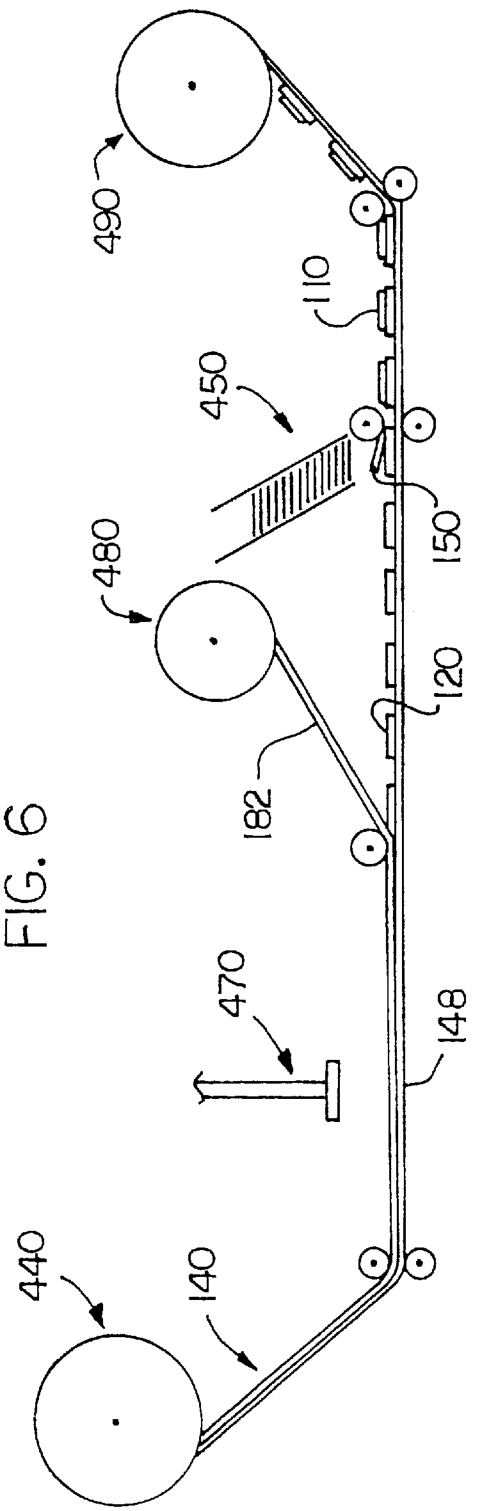
FIG. 6 is a diagrammatic side elevational view of an apparatus adapted to produce the labels of FIG. 5.

Labels 410 of the fifth embodiment may be constructed using the same apparatus as used to construct label 110 as shown in FIG. 6 and by the same method except that tape 740 is substituted for double coated tape 140. Removal of the waste adhesive may be accomplished by applying a laminate to the construction, passing the construction with laminate through a nip roller, and removing the laminate and excess adhesive along with it. Multiple, individual outserts may be placed across the web by multiple outsert applying stations (not shown) spaced across the web. The web may thereafter be slit into a plurality of individual webs having labels thereon.

Figure 15:
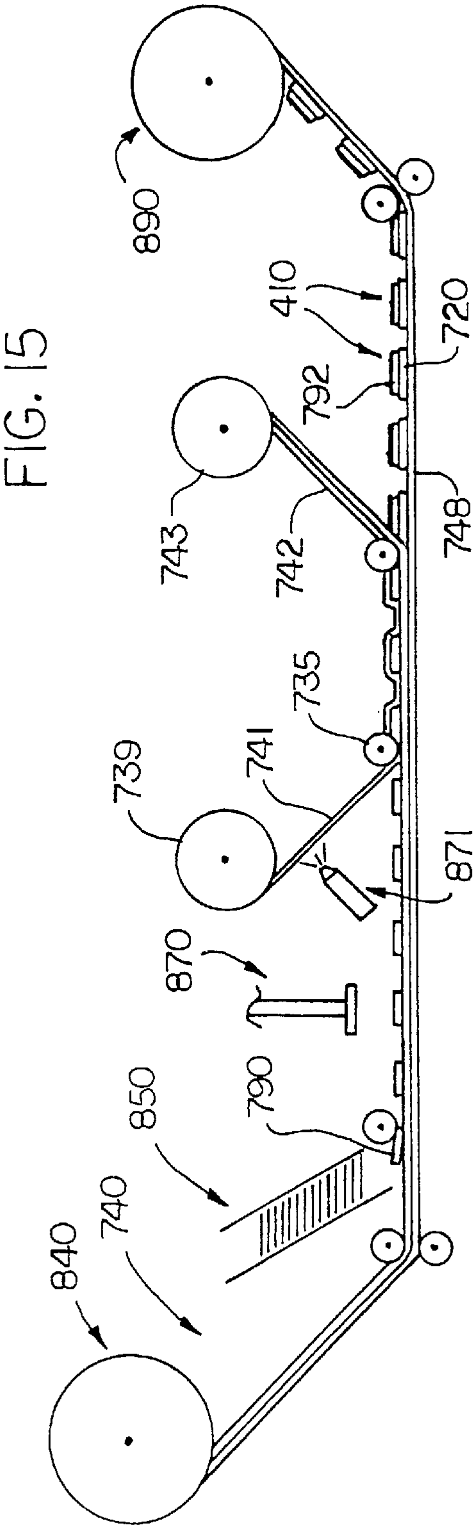
FIG. 15 is a diagrammatic side elevational view of an apparatus adapted to produce the labels of FIG. 11 using multiple up booklets.

With reference to FIG. 15, labels 410 according to the fifth embodiment may be produced using multiple up books using the following method. First, the transfer tape web 740 is unwound from winding station 840 and multiple up books 790 are placed thereon by booklet applying station 850. The multiple up books are then face cut by cutter 870, creating the foot print of the individual outserts and the respective labels 410. Next, a second web of clear laminate material 741 having no adhesive is unwound. The clear laminate is run through a print station 871 which applies band or bands of adhesive in the web direction. The bands are sized and configured to run between each of the individual outserts and adjacent the outer edges of the end outserts if outsert waste portions are present there. Next, the clear laminate material with the adhesive bands is laminated by laminate unwind station 739 to the transfer tape and outserts. The construction is then passed through a nip roller 735 and the laminate material is removed by removal station 743. Removal of the laminate material will pull up the exposed adhesive between the multiple outserts and pull away the outsert waste portion between the outserts (collectively, waste matrix 742). Only the individual outserts 792 and their respective adhesive patches 720 remain on liner 748. The liner with labels thereon may then be slit into two or more webs and/or wound onto a roll by winding station 890.

Labels 510 according to a sixth embodiment of the present invention, as best seen in FIG. 12, may be formed without a laminate cover while still providing a patch 922 which extends beyond the periphery of outsert 950. The numbers 958, 954, 950, 959, 955, 956, 946, 948, 952, and 922 indicate elements which correspond to elements 558, 554, 550, 559, 555, 556, 546, 548, 552, and 522, respectively, of the fourth embodiment. Label 510 includes patch 922 which is larger than outsert 950 such that borders 964 extend beyond the edges of outsert 950. The portions of adhesive layer 946 which make up borders 964 are treated with a deadening agent such that they are no longer adherent. It will be appreciated that labels 510 mounted on release liner 948 may be rolled and unrolled without binding because no adherent adhesive is exposed.

Labels 510 according to the sixth embodiment may be formed using the same apparatus as used to construct label 210 as shown in FIG. 8, and by the same method except that tape 940 is substituted for double coated tape 240. Multiple individual outserts may be placed across the web by multiple outsert applying stations (now shown) spaced across the web. The web may thereafter be slit into a plurality of individual webs having labels thereon. Again, it will be appreciated that the method as described provides a margin of error for locating the outserts and the cut lines.

Figure 16:
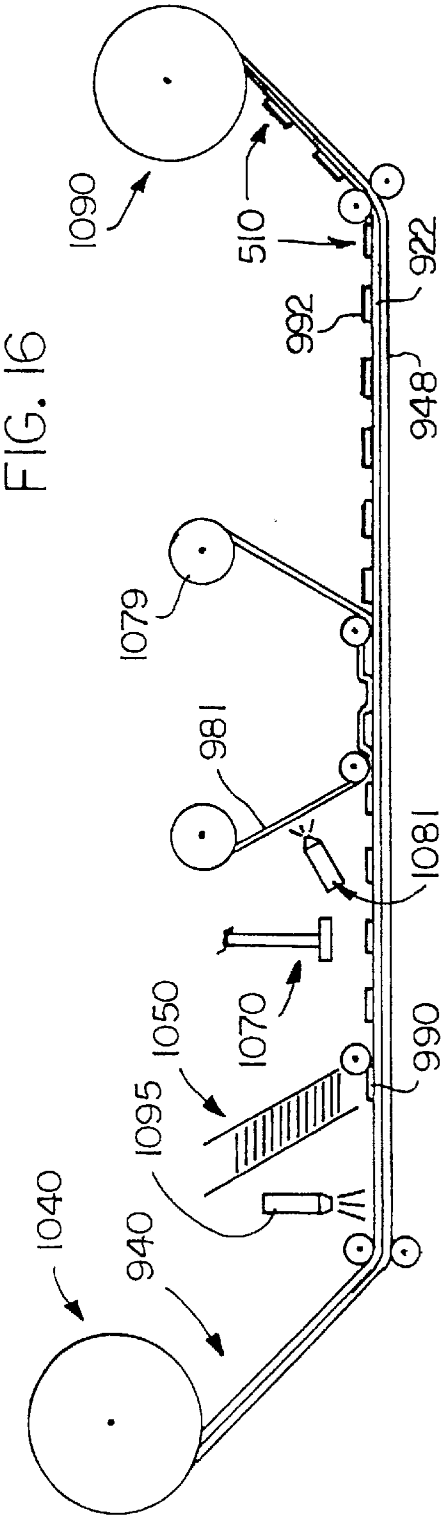
FIG. 16 is a diagrammatic side elevational view of an apparatus adapted to produce the labels of FIG. 12 using multiple up booklets.

With reference to FIG. 16, labels 510 according to the sixth embodiment may be produced using multiple up books 990 using the following method. First, adhesive deadener is applied to the unwound transfer tape web 940 at areas where no books are to be applied by means of coating station 1095. Next, the multiple up books 990 are placed on the web by book applying station 1050. The multiple up books are then face cut down to the release liner by cutter 1070 to form individual outserts 992. As in the previous method, bands of adhesive are applied to a clear laminate material 981 by print station 1081 and the laminate material is then laminated to the transfer tape using nip roller 935. Thereafter, the laminate material is removed by removal station 1079, taking up the outsert waste portions and any exposed, non-deadened adhesive therewith. Optionally, the liner with labels thereon may be slit into two or more webs and/or wound onto a roll by winding station 1090.

As an alternative to unrolling prefabricated transfer tape as disclosed above, the transfer tape may be formed as part of the label forming process. First, a release liner is unwound and the upper surface thereof is coated by a coating station with an adhesive as discussed above. The transfer tape thus formed is thereafter manipulated as described above.

It will be appreciated that labels according to any of the above-described methods can be packaged by winding or fan-folding without exposing the title panel to exposed, activated adhesive, because all of the adhesive not covered by the bottom panel is either covered, deadened, or removed.

It will be appreciated that in each of the methods described above, if a transfer tape of the type having a second release liner is used, the second liner will be removed as a part of the unwinding step.

In any of the methods discussed above, it may also be advantageous to apply adhesive deadener to the double coated tape or to the transfer tape prior to applying the outserts. In particular, one may wish to apply adhesive deadener in areas immediately adjacent to the folded edge side of the outserts. The reason for this is that the folded outserts tend to create a certain amount of bulkiness, and it may be difficult to remove the exposed adhesive immediately next to these locations. In each of the above-described methods, it may be necessary to bring the exposed adhesive layers of the double coated tape or the transfer tape into contact with rollers. Preferably, these rollers are coated with a teflon coating to repel the adhesive and avoid gumming.

In embodiments one and four discussed above, it may be desirable to add a second tear line in the laminate cover adjacent the edge of the outsert opposite the first tear line. With such provision, a user may tear the first tear line, remove the outsert, and then remove the flap of laminate cover by tearing along the second tear line. It will be appreciated that only the remnants of the laminate cover will remain on the package.

Figure 17:
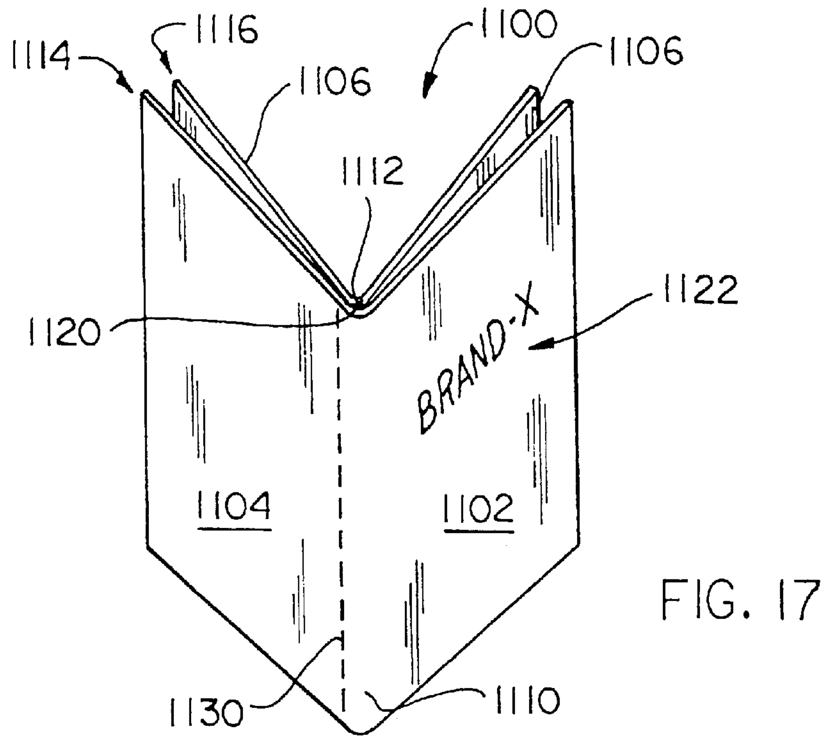
FIG. 17 is a perspective view of a booklet intended for use in labels according to a seventh embodiment of the present invention.

In lieu of outserts 50, 150, 250, 550, 750, and 950, each of which comprise a single piece leaflet, labels according to each of the above-described embodiments using double coated tape and transfer tape may be formed using a first type of booklet 1100 as shown in FIG. 17. Booklet 1100 as shown is commonly referred to as an eight page booklet, i.e., having four panels with two pages each. Booklet 1100 may be formed with varying number of pages, for example 16 or 32 pages. Booklet 1100 includes outer piece 1114 comprising title panel 1102 and bottom panel 1104, and inner piece 1116 comprising interior or intermediate panels 1106. Panels 1102 and 1104 are joined by fold 1110. Panels 1106 are joined by fold 1112. Inner and outer pieces 1114,1116 are secured together at folds 1110,1112 by means of adhesive 1120. Alternatively, and in conventional fashion, staples (not shown) may be used in place of adhesive 1120 for joining pieces 1114,1116.

The outer surface or page of title panel 1102 (i.e., the top page of the booklet) has indicia 1122 printed thereon. Identical or corresponding indicia (not shown) is provided on the interior surface or page of bottom panel 1104.

Perforation 1130 is provided in bottom panel 1104, preferably near fold 1110. Perforation 1130 is preferably formed in the booklet while it is still in sheet form.

Any and all of the labels as described above may be formed using booklet 1100 instead of a leaflet type outsert as described. For example, booklets 1100 may be adhered to a transfer tape web, to a double coated tape web, or to a conventional pressure sensitive base web. Further, any of the methods as described above may be practiced using booklets 1100 rather than a leaflet type outsert as described above.

Figure 18:
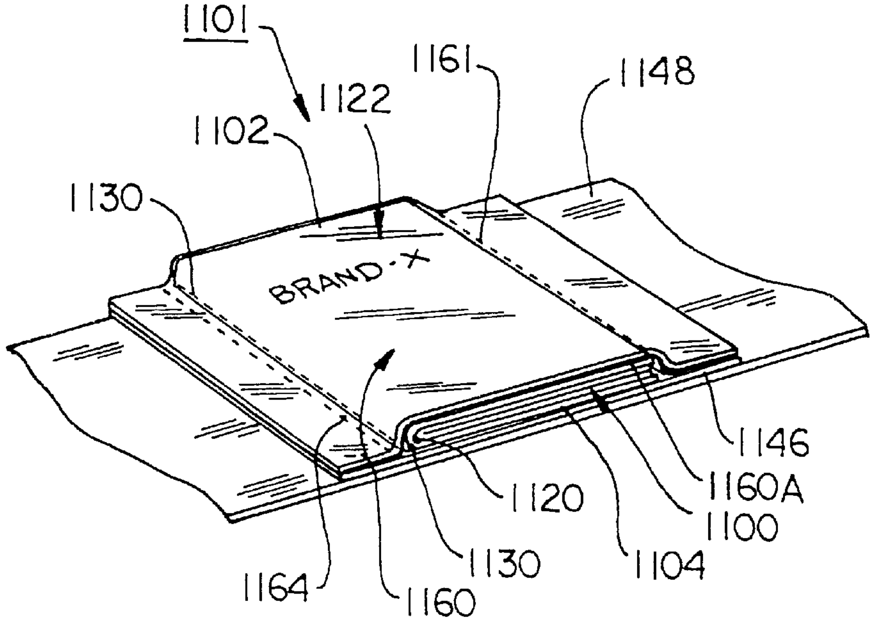
FIG. 18 is a perspective view of a seventh embodiment according to the present invention.

By way of example, a seventh embodiment of a label according to the present invention, generally denoted 1101, is shown in FIG. 18. Labels 1101 are each disposed on release liner 1148 and may be formed using transfer tape as discussed above with regard to the fourth embodiment.

Label 1101 includes adhesive patch 1146 formed from the adhesive layer of the transfer tape and releasably secured to release liner 1148. Label 1101 further includes booklet 1100 which is secured to the top of patch 1146. Laminate cover 1160 covers both booklet 1100 and patch 1146.

Adhesive patch 1146 is somewhat larger than booklet 1100, thereby forming borders 1162. Film layer or laminate cover 1160, preferably clear film of the type described with respect to laminate 560 of the fourth embodiment, is secured to patch 1146 along the peripheral portion of the patch located in borders 1162. Laminate 1160 preferably includes adhesive 1160A on its inner surface, although a non-self adhesive laminate may be used. Laminate 1160 serves to protect booklet 1100 from damage during handling of the package. First perforation 1161 is provided in laminate 1160 to facilitate access to the booklet. Laminate 1160 is further provided with a perforation 1164 such that the portion of laminate 1160 covering booklet 1100 may be removed from the label along with the booklet.

Label 1101 as described above provides several benefits to the manufacturer, the user, and the end consumer. Labels 1101 may be cost effectively and conveniently manufactured as described above with respect to label 540. Booklets 1100 can be used to effectively display a greater amount of information than folded leaflets. The presentation of the information is more pleasing to the end consumer and easier to follow. Moreover, where the end consumer wishes to inspect the booklet without removing it or after removing it, the booklet of label 1101 is more easily closed than a leaflet which must be refolded. Further benefits of labels 1101 may be appreciated from a description of the booklet removal procedure, as described below.

Label 1101 may be applied to a conventional container, for example, by means of adhesive 1146. A consumer wishing to inspect the information in booklet 1100 first tears laminate 1160 at perforation 1161. The user may then flip back the portion of laminate 1160 covering the booklet and inspect the pages of the booklet. If the consumer does not wish to remove the booklet at this time, he may simply reclose the booklet.

If the user does wish to remove booklet 1100 from the container, he simply tears booklet 1100 and a portion of laminate 1160 away from the remainder of the label. More particularly, as the consumer pulls the booklet away, the portion of laminate 1160 covering booklet 1100 tears away from the remainder of the label at perforation 1164. Booklet 1100 tears away from the remainder of the label at perforation 1130, leaving bottom panel 1104 with suitable indicia secured to the container by adhesive patch 1146.

Once removed from the container, booklet 1100 is fully intact except for the absence of bottom panel 1104. The remaining pages of booklet 1100 remain secured together by adhesive 1120. The portion of label 1101 remaining on the container presents a neat appearance because the portion of laminate cover 1160 covering the booklet has been removed. Further, bottom panel 1104, secured to the container, may serve as a primary label to convey any necessary information by means of the aforementioned indicia.

Labels according to the seventh embodiment may be modified in various ways as desired for a given application. As noted above, labels may be formed using booklets 1100 applied to a double coated tape web or a conventional base web (i.e., a self-adhesive backed base stock web of paper or other suitable material). If a transfer tape web or double coated tape web is used, it may be desirable to apply a strip of adhesive deadener underneath booklet 1100 between perforation 1130 and fold 1110 to facilitate tearing of the booklet away from the remainder of the label.

Figure 19:
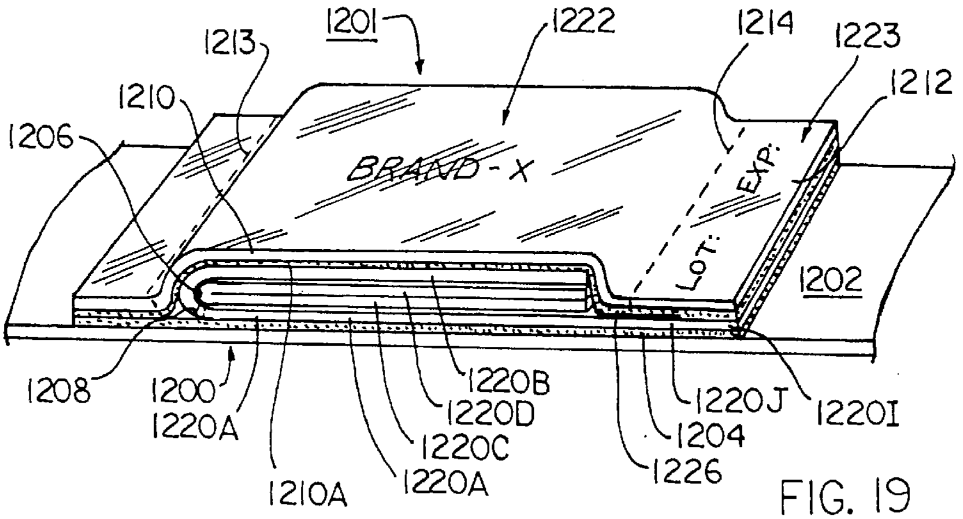
FIG. 19 is a perspective view of an eighth embodiment according to the present invention.

With reference to FIGS. 19–22, a modified booklet type label according to an eighth embodiment and apparatus for forming the same are shown therein. As shown in FIG. 19, label 1201 incorporates booklet 1200 and is releasably adhered to release liner 1202 by pressure sensitive adhesive 1204. Booklet 1200 includes a plurality of panels 1220A, 1220B, 1220C, 1220D as well as outer extended flap portion 1220I and inner extended flap portion 1220J which together extend as an integral flap from bottom panel 1220A. Bottom panel 1220A and top panel 1220B are joined by a fold. Interior panels 1220C and 1220D are also joined by a fold and are secured to panels 1220A and 1220B by adhesive 1206 interposed between the respective folds. Laminate cover 1210 preferably of the same type as laminate 560 is secured to booklet 1200 by adhesive 1210A and is further releasably adhered to release liner 1202 by the portion of adhesive 1204 extending beyond the folded edge of booklet 1200.

Bottom panel 1220A is provided with tear line 1208 proximate the fold. Release varnish 1226 is disposed on the upper surface of inner flap portion 1220J. Title indicia 1222 is printed on the upper surface of top panel 1220B. Primary indicia 1223 is printed on the upper surface of outer extended flap portion 1220I. Laminate cover 1210 includes tear line 1214 formed in marginal portion 1212 adjacent release varnish 1226. Laminate cover 1210 is preferably transparent so that title indicia 1222 and primary indicia 1223 may be viewed through the laminate cover.

Label 1201 may be used as follows. Label 1201 is first removed from release liner 1202 and substantially permanently adhered to an object by means of adhesive 1204. Indicia 1222, 1223 and/or indicia printed on laminate cover 1210 are visible and may serve, for example, to identify the object or its contents. When the user wishes to access the information printed on the panels of booklet 1200, he or she simply tears laminate cover 1210 along tear line 1214. It will be appreciated that a portion of laminate cover 1210 adjacent booklet 1200 is easily removed from inner flap portion 1220J due to the presence of release varnish 1226. The remainder of marginal portion 1212 will remain adhered to outer flap portion 1220I. Moreover, because outer flap portion 1220I is permanently secured to the object by adhesive 1204, the portion of marginal portion 1212 adhered to portion 1220I (and hence, indicia 1223) will be permanently secured to the object as well. Further, a manufacturer, for example, may print further indicia (not shown) such as the lot number and date of packaging on the upper surface of marginal portion 1212 next to indicia 1223, this further information remaining with the object also. Once the user has lifted laminate cover 1210, he may then inspect booklet 1200. If desired, the user may reseal label 1201 by remarrying adhesive 1210A to release varnish 1226. If the user wishes to remove booklet 1200, he simply tears booklet 1200 from the object along tear line 1208, leaving bottom panel 1220A adhered to the object. Simultaneously, laminate cover 1210 will tear away from the object at tear line 1213. Preferably, the upper, now exposed surface of bottom panel 1220A is provided with suitable indicia 1221 (e.g., indicia identical to indicia 1222).

Figure 20:
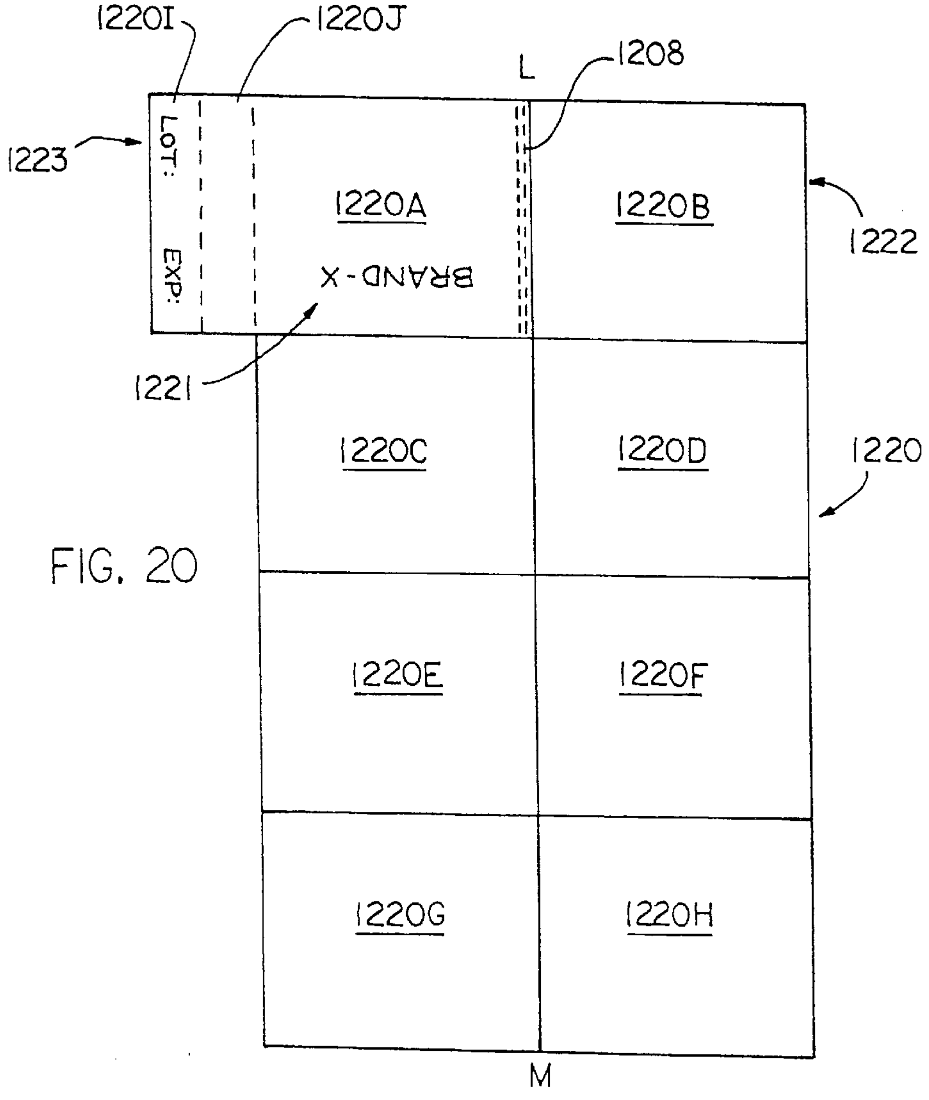
FIG. 20 is a plan view of a booklet blank for forming a booklet for incorporation in the label according to the eighth embodiment.

Booklets 1200 as described above may be formed from a booklet blank 1220 as shown in FIG. 20. Booklet blank 1220 is designed to form a sixteen page (eight panel) booklet. Note that in FIG. 19, panels 1220E, 1220F, 1220G, and 1220H have been omitted for clarity, however, it will be appreciated from the following description that these panels would constitute panels disposed between panels 1220A and 1220C and between panels 1220B and 1220D.

Booklet blank 1220 may be formed using a flexographic/rotary letter press or a sheet fed offset press as described in more detail below. Booklet 1200 is formed by, for example, applying a strip of adhesive along fold line L-M, folding panels 1220G and 1220H onto panels 1220E and 1220F, respectively, then folding panels 1220E and 1220F onto panels 1220C and 1220D, respectively, then folding panels 1220C and 1220D onto panels 1220A and 1220B, respectively, and finally folding panel 1220B onto panel 1220A. Before or after the construction so formed is applied to an adhesive web or a support web, each of the side folds (i.e., extending between the end fold joining panels 1220A and 1220B and extended flap portion 1220I) are cut through to form individual panels joined by the respective end folds only.

Figure 21:
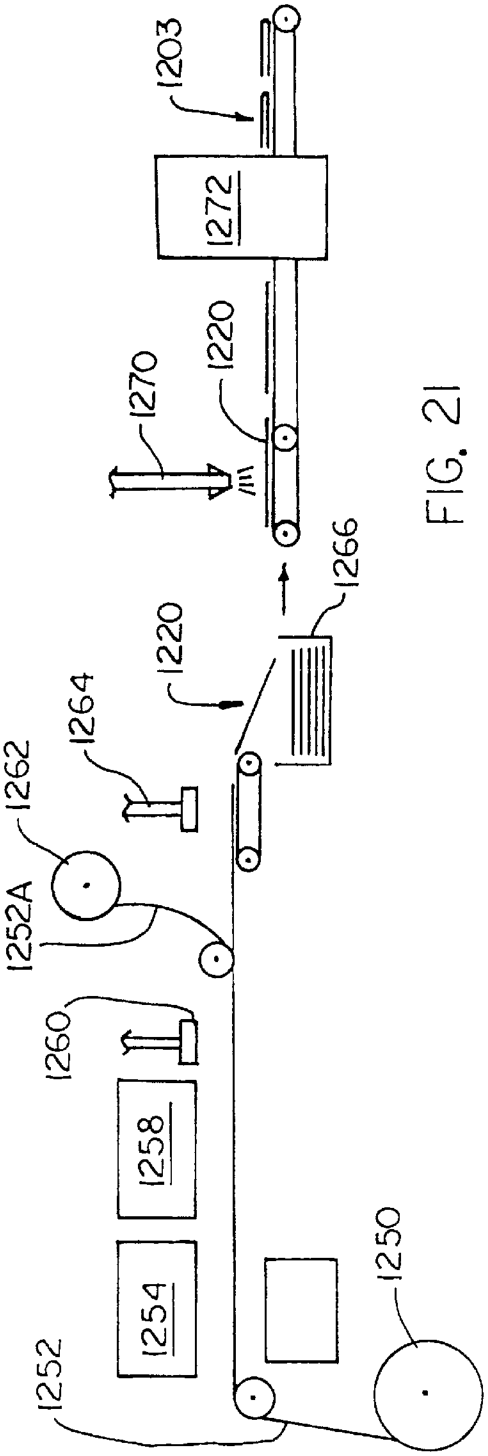
FIG. 21 is a diagrammatic side elevational view of an apparatus adapted to produce booklets for incorporation in labels according to the eighth embodiment.

With reference to FIG. 21, booklets 1200 may be formed using any type standard printing process, for example, flexography, rotary letterpress, web and sheetfed offset, or rotary gravure. Suitable apparatus include a Mark Andy Flexo Press manufactured by Mark Andy Inc. of Chesterfield, Mo. A web of suitable stock paper material 1252, such as 35 lb. offset Fleckopake available from Fletcher Paper Co. of Alpena, Mich., is first unwound from unwind stand 1250. Suitable indicia including indicia 1222 and 1223 are printed on the upper and lower surfaces of web 1252 by print stations 1254, 1256. Release varnish 1226 is printed by print station 1258 across the portion of web 1252 which is to become inner flap portion 1220J. Suitable release varnishes include L075 available from Paragon Inks, Inc. of Connecticut.

Prior to or subsequent to the aforementioned printing steps, web 1252 is cut by die cut station 1260 preferably including a rotary or flatbed die forming a part of the web letterpress. Die cut station 1260 forms a cut line defining an extended flap consisting of portions 1220I, 1220J. Preferably, the die cut is formed such that a lengthwise continuous strip of waste matrix 1252A extends along one side of web 1252. Waste matrix 1252A is taken up on rewind stand 1262. Web 1252 is thereafter sheeted by die cut station 1264 and collected in magazine 1266. Tear line or perforation 1208 may be formed at either of die cut stations 1260 and 1264 or at a further die cut station.

A single band of adhesive is applied by adhesive applicator 1270 along fold line L-M of booklet blank 1220. This band of adhesive ultimately becomes adhesive 1206 of booklet 1200. Thereafter, booklet blank 1220 is passed through a folder 1272 which serves to fold booklet blank 1220 as discussed above into construction 1203 (i.e., booklet 1200 prior to cutting of side folds). Suitable folder apparatus include an MBO available from MBO America of Illinois or a G & K Folder available from Vijuk Equipment of Elmhurst, Ill.

Figure 22:
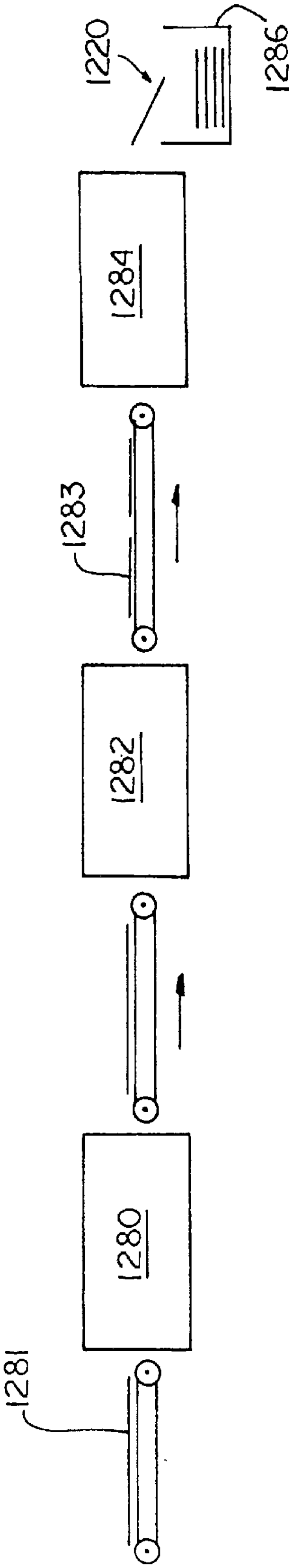
FIG. 22 is a diagrammatic side elevational view of an apparatus adapted to produce labels according to the eighth embodiment.

With reference to FIG. 22, booklets 1200 may, alternatively, be formed using a conventional sheetfed offset press such as a Heidelberg 102ZP from Heidelberg, Inc. of Germany. A relatively large sheet of stock paper material is introduced to the sheetfed offset press 1280. Press 1280 prints the desired indicia on both the upper and lower surfaces of sheet 1281 (i.e., "perfects" the sheet). The operation and use of sheetfed offset presses for this purpose is well-known by those of ordinary skill in the art and will not be discussed in detail here. Printed sheet 1281 is thereafter transported to cutter 1282 which cuts sheet 1281 so as to subdivide sheet 1281 into smaller sheets 1283. Sheets 1283 are introduced to high die 1284, for example a Lombardy High Die available from Vijuk Equipment. High die 1284 cuts sheets 1283 such that booklet blanks 1220 are formed. Booklet blanks 1220 are collected in magazine 1286. Thereafter, the booklet blanks are folded as discussed above with regard to FIG. 21.

Label 1201 may be formed from construction 1203 using the same apparatus as discussed above for label 1101 of the seventh embodiment. It will first be appreciated that booklet 1200 has not yet been formed by the above procedure, but rather a construction 1203 is formed. In order to form booklet 1200 from construction 1203, each of the folds transverse to the length of blank 1220 (i.e., between 1220G and 1220E, between 1220H and 1220F, between 1220E and 1220C, etc.), the side folds once the blank has been folded, must be cut so that each of the panels will only be joined with another panel by means of the longitudinal fold (i.e., along line L-M). Restated, the "side folds" of construction 1203 must be cut so that only the folds between panels 1220A and 1220B and between 1220C and 1220D remain. This may be accomplished prior to forming labels 1201 using a die cutter or other suitable means. Preferably, however, cutting of the transverse folds is executed during formation of the label, as follows.

After construction 1203 is placed on a transfer tape web, a clear laminar web is placed over the construction. Thereafter, a die cutter die cuts out the individual booklets 1200 and label 1201 and removes the waste material. The die cuts include the folds adjacent both sides of the extended underflap (portions 1220I,1220J), thereby severing the side folds and forming booklet 1200. The die cuts also form tear lines 1213 and 1214 and define the perimeter of label 1201. Each of the above described die cuts may be formed by a single die cutter or by more than one. The resulting waste matrix is removed as discussed above. Each individual booklet may form a single booklet, or may be used as a multiple up booklet.

As an alternative to the above described methods for forming booklet 1200, the booklet may be formed using a separately formed cover. The interior panels would be formed according to either of the methods discussed above for forming booklet 1200 except that panels 1220A, 1220B and extended flap portions 1220I, 1220J would not be formed. A separate cover corresponding to panels 1220A, 1220B and portions 1220I, 1220J is formed as a sheet and thereafter folded about the interior panels. It will be appreciated that this procedure does not affect the remaining steps, including the step of cutting the side folds.

It will be appreciated that booklets 1200 as described above may be used to form labels using double coated tape or a base web as well using the methods as described above. If a base web is to be used, adhesive may be selectively applied to either the bottom surface of the booklet or the upper surface of the base web with the booklet thereafter being adhered thereby to the base web.

A release varnish may be placed over the entirety of the upper surface of top panel 1220B so that when laminate cover 1210 is pulled up, it will separate from the top panel. Again, adhesive deadener may be applied adjacent the fold between the top and bottom panels to facilitate removal of the booklet.

Figure 23:
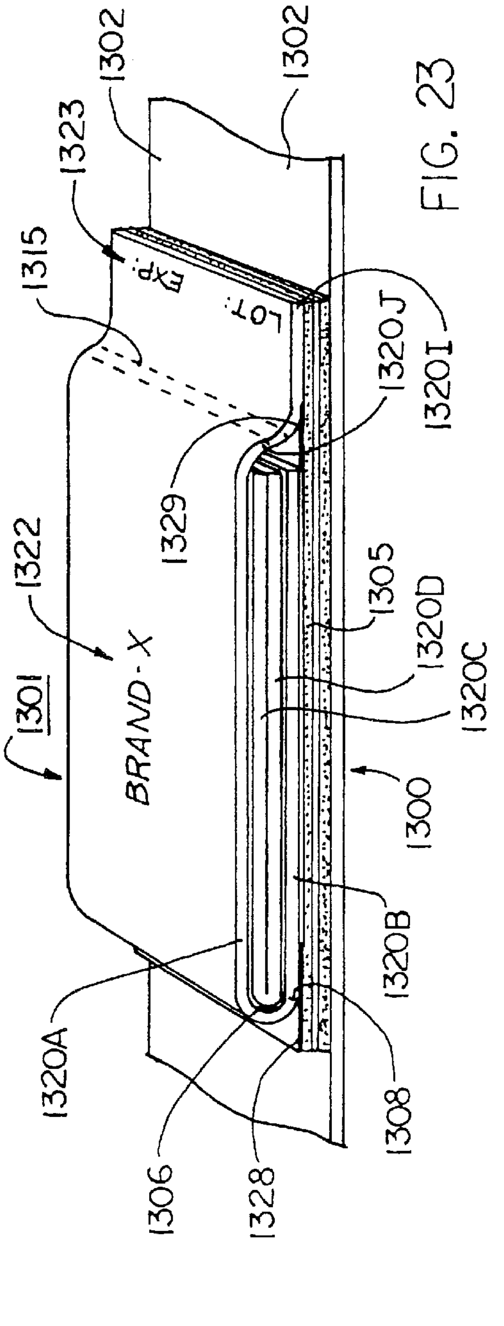
FIG. 23 is a perspective view of a ninth embodiment according to the present invention.

With reference to FIG. 23, label 1301 according to a ninth embodiment of the present invention is shown therein. Label 1301 incorporates a booklet 1300 similar to booklet 1200 of label 1201. Panels 1320A, 1320B, 1320C, and 1320D correspond to panels 1220A, 1220B, 1220C, and 1220D, respectively, of booklet 1200 and are held together by adhesive 1306 corresponding to adhesive 1206. Notably, panel 1320B is the bottom panel and 1320A is the top panel, i.e., the reverse of booklet 1200. Tear line 1308 is formed in bottom panel 1320B adjacent the fold between bottom panel 1320B and top panel 1320A. Title indicia 1322 is printed on the upper surface or page of top panel 1320A and primary indicia 1323 is printed on the upper surface of extended flap portion 1320I. Tear line 1315 is formed in extended flap portion 1320J.

It will be appreciated that booklet 1300 may be formed using the methods and apparatus described above for booklet 1200, except for the provision of tear line 1315, the absence of release varnish, and the placement of the indicia and tear line 1308. Suitable modifications to the aforementioned methods and apparatus discussed with regard to the formation of booklets 1200 will be readily apparent to those of ordinary skill in the art.

Label 1301 includes double coated tape patch 1305 formed from double coated tape as discussed above with respect to the first, second, and third embodiments. Booklet 1300 is adhered by means of bottom panel 1320B and extended flap portion 1320I to the upper layer of adhesive of patch 1305. Notably, booklet 1300 is flipped 180 degrees relative to the position of booklet 1200 on adhesive 1204 of the eighth embodiment. Also, no laminate cover is provided. A strip of adhesive deadening agent 1328 is disposed on the upper surface of patch 1305 adjacent the folded edge of booklet 1300, preferably covering at least the width of patch 1305 from tear line 1308 to the adjacent end edge of the patch.

In use, label 1301 is removed from release liner 1302 and substantially permanently adhered to a desired object by means of adhesive patch 1305. When the end user wishes to access booklet 1300, he or she may tear along tear line 1315. Notably, no release varnish is needed on extended flap portion 1320J, however, an adhesive deadener 1329 is preferably provided. However, if desired, release varnish may be applied at extended flap portion 1320I to provide for resealability. Once booklet 1300 has been opened, it may be removed from label 1301, and thus the object, by tearing along tear line 1308. Bottom panel 1320B as well as extended flap portion 1320I with primary indicia 1323 will remain permanently adhered to the object. Preferably, indicia corresponding to title indicia 1322 is disposed on the upper, now exposed surface of bottom panel 1320B.

Figure 24:
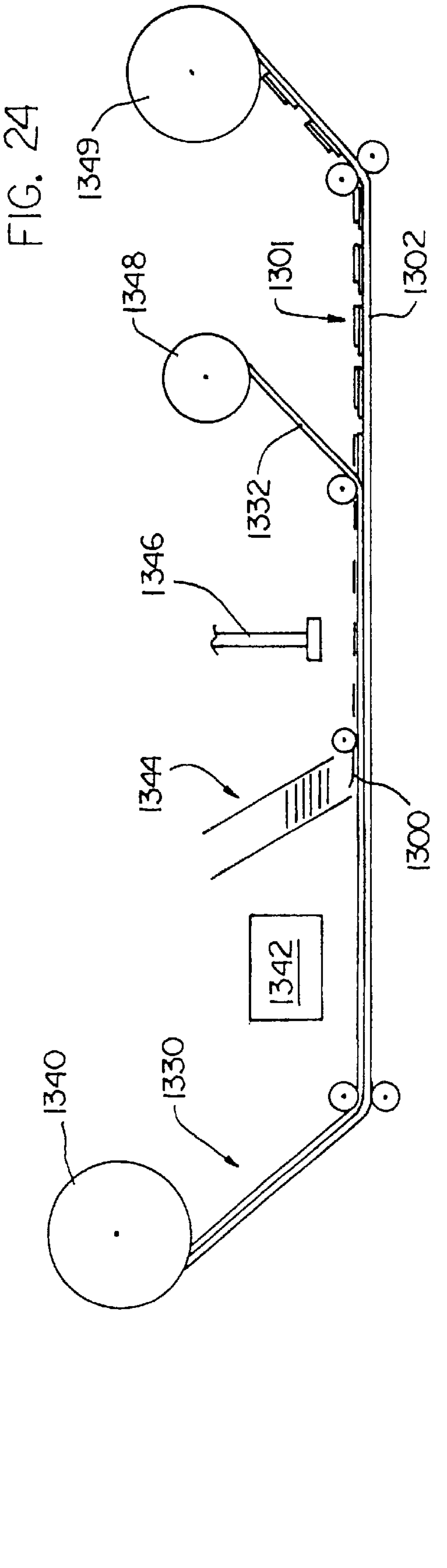
FIG. 24 is a diagrammatic side elevational view of an apparatus adapted to produce the labels of the ninth embodiment.

With reference to FIG. 24, labels 1301 may be formed using a flexographic press as schematically shown therein. Suitable flexographic presses include Mark Andy 2200 Flexo Press.

First, a suitable double coated tape 1330 such as, for example, Flexcon Flexmark product number DFM-100-CLEAR V-23/70 D/Fk is delivered from unwind stand 1340. Deadener application station 1342 applies transverse strips of deadener to web 1330 corresponding to deadened adhesive strips 1328 of label 1301. Suitable deadening agents include Product No. F11512 from K & W Printing, Inc. of Franklin Park, Ill. Booklets 1300 or constructions corresponding to constructions 1203 of the eighth embodiment are then successively applied to web 1330 by booklet applying station 1344 such that the folded edge thereof is adjacent or partially on the respective deadened adhesive strip. Die cut station 1346 forms a cut line defining the respective label 1301. The cut line formed adjacent the folded edge of the booklet is formed through the deadened adhesive strip. Each of the other three cut lines are formed immediately adjacent the booklet or through the booklet (forming booklet 1300 by severing the side folds if an unfinished construction has been applied to the web). In this way, no exposed, tacky adhesive is disposed within the cut lines. The waste matrix 1332 defined outside the cut lines formed by die cut station 1346 is thereafter removed by rewind stand 1348. Labels 1301 which remain on release liner 1332 may be wound onto a roll by rewind stand 1349.

A conventional base web including a web of adhesive backed face stock may be substituted for double coated tape web 1330. In such case, adhesive must be applied to bottom panel 1320B or selectively to the upper surface of the base web prior to applying the booklet to the face stock.

With reference to FIG. 25, a label 1401 according to a tenth embodiment of the present invention is shown therein. Label 1401 is disposed on release liner 1402 and incorporates booklet 1400 and laminate cover 1410. Label 1401 is releasably adhered to liner 1402 by adhesive 1404.

Laminate cover 1410 is similar to or the same as laminate cover 1210 of label 1201. Elements 1410A, 1412, and 1413 correspond to elements 1210A, 1212, and 1213 of label 1201, respectively. Tear line 1414 formed in laminate cover 1410 is formed over and substantially aligned with tear line 1414A formed in second flap 1420K as discussed below.

Booklet 1400 is similar to booklet 1200 of the eighth embodiment. In particular, elements 1406, 1408, 1420A, 1420B, 1420C, 1420D, 1420E, 1420F, 1420G, 1420H, 1420I, 1420J, 1421, 1422, and 1423 correspond to elements 1206, 1208, 1220A, 1220B, 1220C, 1220D, 1220E, 1220F, 1220G, 1220H, 1220I, 1220J, 1221, 1222, 1223, respectively. Again, panels 1420E, 1420F, 1420G, and 1420H are shown in FIG. 26 which shows booklet blank 1420, but have been left off of label 1401 as shown in FIG. 25 for clarity.

Booklet 1400 and booklet blank 1420 differ from booklet 1200 and booklet blank 1220 by the provision of integral second flap 1420K and the absence of any varnish coating corresponding to varnish 1226. Further, second flap 1420K is provided with tear line 1414A. Notably, second flap 1420K may be formed adjacent any of panels 1420B, 1420C, 1420D, 1420E, 1420F, 1420G, and 1420H. Moreover, second flap 1420K may extend adjacent more than one such panel. Bottom panel 1420A may terminate at the end edge of second flap 1420K, with indicia 1423 and tear lines 1414 and 1414A suitably repositioned.

In use, booklet 1420 may be accessed and removed in much the same way as booklet 1420. When tear line 1414 is torn, tear line 1414A adhered to the laminate cover will tear as well. Thereafter, top panel 1420B and the portion of laminate cover 1410 adhered thereto may be readily lifted open and away from bottom panel 1420A, there being no adhesive between the second flap and extended flap portion 1420J to restrict separation. Indicia 1421 and 1423 will remain adhered to the object.

Booklet 1400 may be formed by the same methods and apparatus as discussed above with regard to booklet 1200. The die cutter used to form booklet blank 1220 may be modified to form second extended flap 1420K as a part of booklet blank 1420. When the final fold (i.e., between panels 1420A and 1420B) is executed, second extended flap 1420K will overlie inner extended flap portion 1420J. The step of applying varnish to the first extended flap (i.e., portions 1420I and 1420J) is eliminated, substantially increasing the efficiency and reducing the cost of forming labels 1401 in that the varnish material and registry of the varnish with the flap are not required. Preferably, tear line 1414 and tear line 1414A are formed by a single die cut operation.

As in the case of labels 1201, a double coated tape or base web may be used in place of the transfer tape web. Also, a release varnish may be placed over the upper surface of the title panel so that the title panel and the laminate cover would be made separable.

Figure 27:
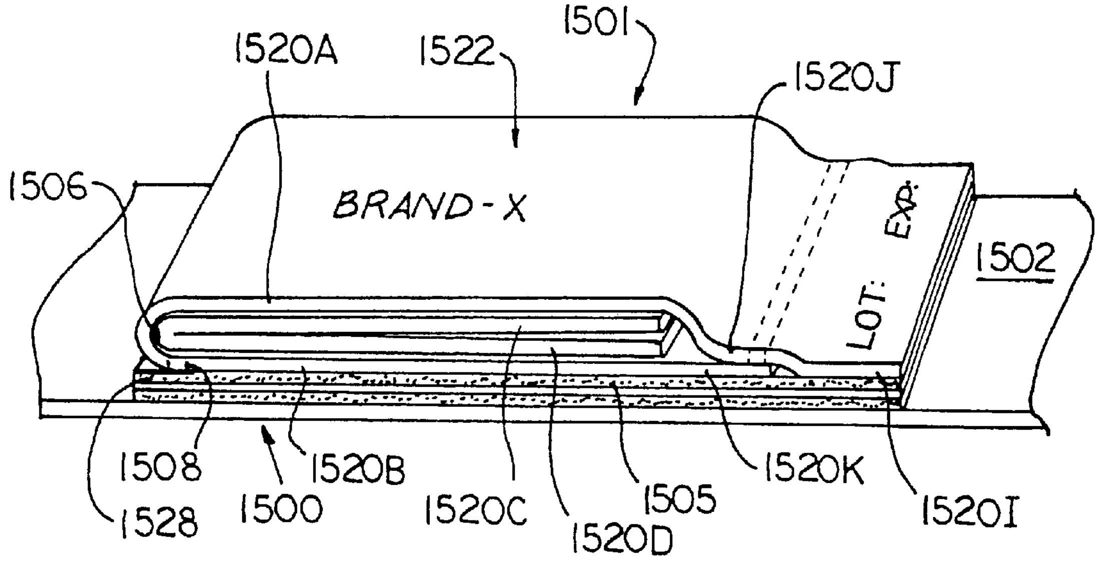
FIG. 27 is a perspective view of an eleventh embodiment according to the present invention.

With reference to FIG. 27, a label 1501 according to an eleventh embodiment of the present invention is shown therein. Label 1501 is disposed on release liner 1502 and includes booklet 1500 releasably adhered to the liner by means of double coated tape patch 1505. Patch 1505 corresponds to patch 1305 of label 1300 according to the ninth embodiment described above. Deadened adhesive strip 1528 corresponds to deadened adhesive strip 1328 of to the ninth embodiment.

Booklet 1500 is similar to booklet 1400 as described above. More particularly, elements 1506, 1520A, 1520B, 1520C, 1520D, 1520I, 1520J, 1520K, 1522, and 1523 correspond to elements 1406, 1420A, 1420B, 1420C, 1420D, 1420I, 1420J, 1420K, 1422, and 1423, respectively. Notably, panel 1520A is the top panel and has title indicia 1522 thereon and panel 1520B is the bottom panel with tear line 1508 formed therein. Booklet 1500 is further provided with tear line 1515 formed in inner extended flap portion 1520J such that the tear line overlies second extended flap 1520K.

In use, label 1501 may be removed from release liner 1502 and substantially permanently adhered to an object or container by the lower adhesive layer of patch 1505. The end user may access booklet 1500 by tearing tear line 1515, allowing top panel 1520A to be freely pulled away, second flap 1520K being interposed between inner extended flap portion 1520J and adhesive patch 1505. If desired, booklet 1500 may be removed by tearing along tear line 1508. Bottom panel 1520B and outer extended flap portion 1520I (and thus indicia 1523) each remain adhered to the object by means of patch 1505 to which they are directly adhered. Preferably, indicia corresponding to title indicia 1522 is disposed on the upper, now exposed surface of bottom panel 1520B.

Booklets 1500 may be formed using the same methods and apparatus as booklets 1400 except that tear line 1508 is formed in panel 1520B and placement of the various indicia is suitably modified. Labels 1501 may be formed with booklets 1500 using the methods and apparatus as discussed above with regard to labels 1301 of the ninth embodiment.

As in the case of labels 1301 according to the ninth embodiment, a base web may be substituted for the double coated tape web. Booklet 1500 may also be advantageously used as a cut label, that is, adhesive being applied just prior to application of the booklet to a container, without the provision of a support web or preexisting double coated tape adhesive patch 1505.

Figure 28:
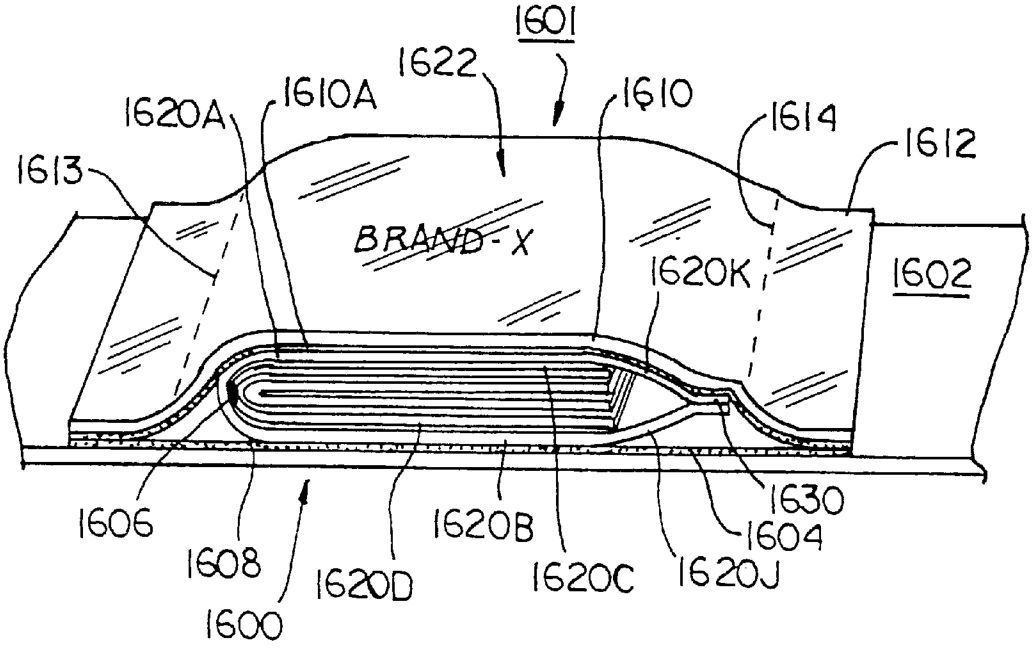
FIG. 28 is a perspective view of a twelfth embodiment according to the present invention.

With reference to FIG. 28, a label 1601 according to a twelfth embodiment of the present invention is shown therein. Label 1601 is disposed on release liner 1602 and includes booklet 1600 and laminate cover 1610. Label 1601 is releasably adhered to release liner 1602 by adhesive 1604.

Laminate cover 1610 is similar to or the same as laminate cover 1210 of label 1201. Elements 1610A, 1612, and 1613 correspond to elements 1210A, 1212, and 1213 of label 1201, respectively. Tear line 1614 is formed in laminate cover 1410 immediately adjacent upper extended flap 1620K and lower extended flap 1620J, as discussed below.

Booklet 1600 is similar to booklet 1200 of the eighth embodiment. In particular, elements 1606, 1608, 1620A, 1620B, 1620C, 1620D, 1620J, and 1622 correspond to elements 1206, 1208, 1220A, 1220B, 1220C, 1220D, 1220J, and 1222, respectively. Whereas booklet 1200 included inner and outer extended flap portions 1220I and 1220J, booklet 1600 includes lower extended flap portion 1620J which extends beyond the interior panels of the booklets substantially the same distance as upper extended flap 1620K. Releasable adhesive strip 1630 is provided between extended flaps 1620J and 1620K.

In use, label 1601 may be removed from release liner 1602 and substantially permanently adhered to an object by means of adhesive 1604. Booklet 1600 may be accessed by tearing along tear line 1614. As laminate cover 1610 is pulled upward, upper extended flap 1620K which is adhered to the laminate cover by adhesive 1610A is pulled away from lower extended flap 1620J to which it is releasably adhered. If the user wishes to remove booklet 1600, he or she may do so by further tearing along tear line 1613 and tear line 1608.

Booklet 1600 may be formed using the methods and apparatus as discussed above with regard to booklet 1400, except that extended flaps 1620J and 1620K are formed to be substantially the same size and length, and no portion corresponding to outer extended flap portion 1420I is formed. Alternatively, panels 1620A and 1620B may be formed as a separate cover which is attached to the remainder of the booklet after the formation of the interior panels. Further, prior to making the final fold, adhesive strip 1630 is applied across either of extended flaps 1620J and 1620K. Adhesive strip 1630 may be, for example, G3161 cold adhesive available from Fuller Adhesive Company of Minnesota.

Once formed, booklet 1600 may be used to form label 1601 by applying the same to a transfer tape as described above for label 1200 except that cut line 1614 is formed in the laminate cover adjacent the edges of the extended flaps rather than over an extended flap portion as in the case of label 1201.

Label 1601 may be formed using a double coated tape web or a self-adhesive base web as discussed above with regard to label 1201. Further, the upper surface of the title panel may be coated with a release varnish to allow the laminate cover to be separated from the title panel.

As an alternative to the embodiment shown in FIG. 28, label 1601 may be formed without a laminate marginal portion 1612 extending beyond extended flaps 1620J, 1620K. Rather, laminate cover 1610 would terminate where tear line 1614 is formed with lower extended flap 1620J coated on its underside with adhesive 1604.

In the case of either of labels 1201 and 1601, if the respective booklets are formed using separately formed covers (i.e. which constitute the top and bottom panels), it may be desirable to form the covers from a transparent material, such as polypropylene. If this option is chosen, the title indicia may be printed on the top page of the underlying interior panel during the formation of the interior portion, which may be formed from a unitary booklet blank. This option would eliminate the risk of mismatching indicia by mismatching the cover and the interior portion components.

Figure 29:
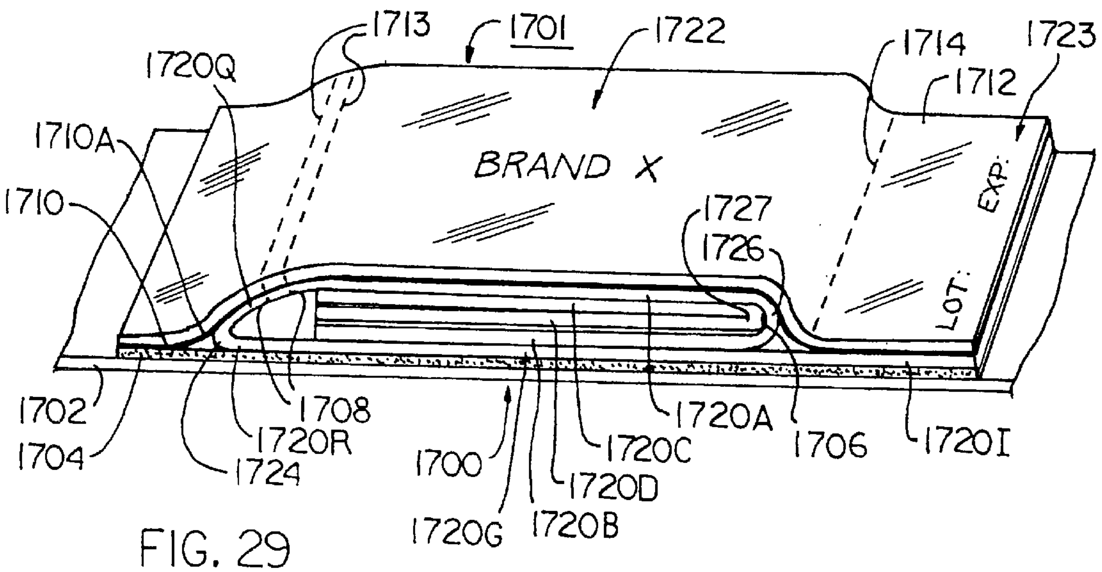
FIG. 29 is a perspective view of a thirteenth embodiment according to the present invention.

With reference to FIG. 29, a label 1701 incorporating a booklet 1700 according to a thirteenth embodiment of the present invention is shown therein. Label 1701 is disposed on release liner 1702 and includes booklet 1700 and laminate cover 1710. Label 1701 is releasably adhered to release liner 1702 by adhesive 1704. Laminate cover 1710 is similar to or the same as laminate cover 1210 of label 1201. Elements 1710A, 1712, and 1714 correspond to elements 1210A, 1212, and 1214 respectively. Further, laminate cover 1710 includes parallel, spaced apart tear lines 1713 overlying tear lines 1708 as discussed below.

Figure 30:
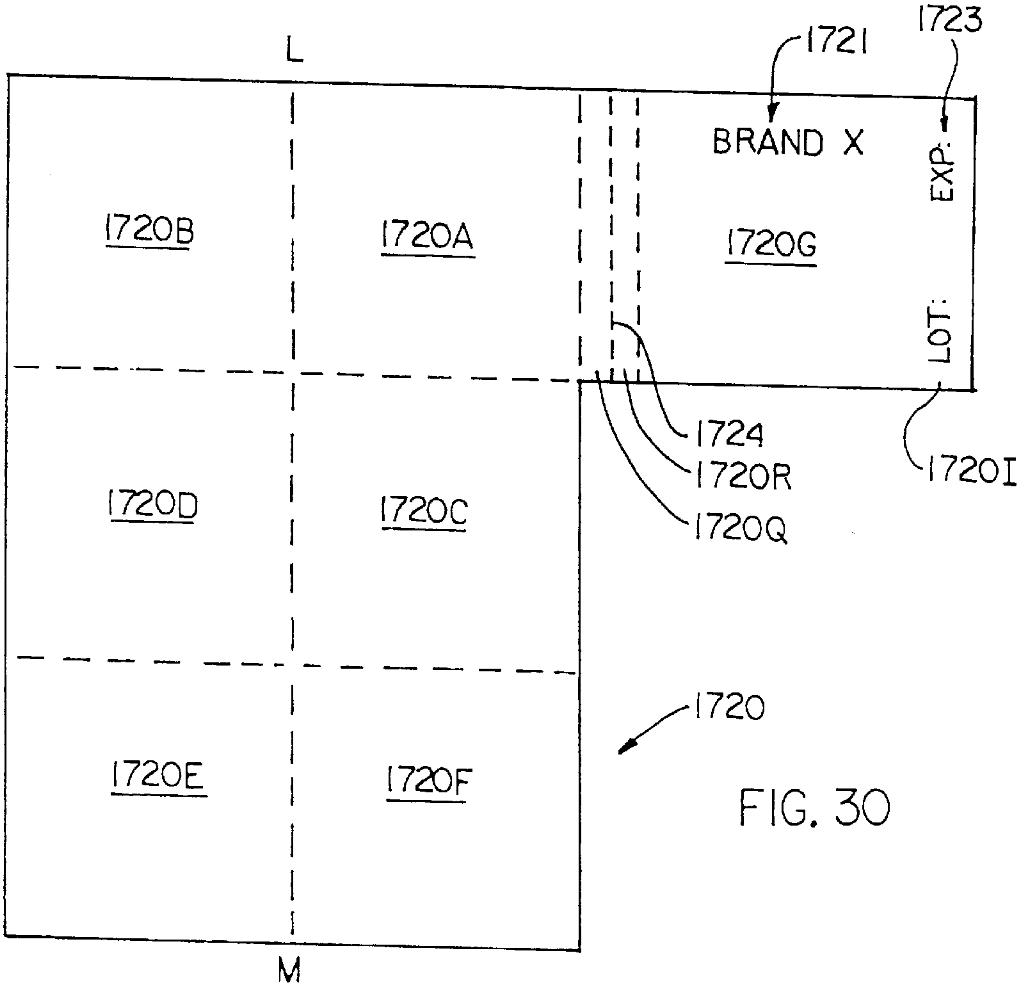
FIG. 30 is a plan view of a booklet blank for forming a booklet for incorporation in the label according to the thirteenth embodiment.

With reference to FIGS. 29 and 30, booklet 1700 includes bottom panel 1720G having extended flap 1720I and joined to top panel 1720A by fold 1724. Top panel 1720A is joined to interior panel 1720B by a fold 1726 opposite fold 1724. Preferably, panels 1720G, 1720A, and 1720B are formed from a single, continuous piece. Interior panels 1720C and 1720D are joined to one another by fold 1727 and to the remainder of the booklet by adhesive strip 1706 which adheres folds 1726 and 1727. Top panel 1720A includes title indicia 1722 on the upper surface thereof. Extended flap 1720I includes primary indicia 1723 disposed on the upper surface thereof. Further, bottom panel 1720G includes primary indicia 1721 printed on the upper surface thereof as well. FIG. 30 is a plan view of blank 1720 from which booklet 1700 may be formed. Note that panels 1720E and 1720F are not shown in FIG. 29 for the sake of clarity. Panel 1720E would be disposed between panels 1720B and 1720D in the label. Panel 1720F would be disposed between panels 1720A and 1720C in the label.

Bottom panel 1720G includes marginal portion 1720R extending between the ends of interior panels 1720B, 1720C, and 1720D and fold 1724. Top panel 1720A includes marginal portion 1720Q extending between interior panels 1720B, 1720C, and 1720D and fold 1724 and substantially coextensive with marginal portion 1720R. Substantially parallel tear lines 1708 are formed in marginal portion 1720Q.

In use, label 1701 may be applied to a container in the same manner as discussed for the above described labels. Information regarding the label and/or the container is exposed on the upper surface of the top panel and the extended flap. When the end user wishes to access the information printed in booklet 1700, he or she tears along tear lines 1708, 1713. The user may then lift top panel 1720A and inspect the information printed on the interior panels and bottom panel. If the user wishes to remove the top and interior panels, he or she may do so by tearing along tear line 1714 formed in laminate cover 1710. Extended flap 1720I (and laminate marginal portion 1712), bottom panel 1720G including marginal portion 1720R, the portion of marginal portion 1720Q extending between tear line 1708 and fold 1724, and the portion of laminate cover 1710 extending between tear line 1708 and fold 1724 will remain with the object. In this way, indicia 1721, 1723 will remain to serve as the primary label for the container.

Booklet 1700 and label 1701 may be formed using the same apparatus and methods as discussed with regard to booklet 1200 and label 1201, except that booklet 1700 requires a different folding configuration and dual tear lines 1713 and 1708 are formed. Suitable modifications to the above noted methods and apparatus will be appreciated by those of ordinary skill in the art upon a reading of the foregoing. Further, it will be appreciated that single tear lines may be used in place of dual tear lines 1713 and 1708. Note that adhesive strip 1706 is applied along line L-M as shown in FIG. 30.

It will be appreciated that labels 1201, 1301, 1401, 1501, 1601, and 1701 provide particular advantage when applied to round or oddly shaped containers. This is because the designs of the incorporated booklets allow for a greater degree of relative movement between the upper and lower panels without buckling. This is particularly true if the label is applied from the fold side, i.e., the folded edge is applied to the container first.

It will be appreciated that any of the aforementioned booklets may be formed having any number of panels. The numbers of panels discussed with regard to each label embodiment are for the purpose of illustration only.

It will be appreciated that each of the booklets and labels formed from booklets as described above provide for display of a greater amount of information than conventional leaflet-type outserts and inserts. Further, the booklets are easier and less awkward to use than leaflets.

Moreover, it will be appreciated that each of the above described booklets may be formed as multiple up books. After the multiple up books are applied to a suitable web, they may be slit into respective booklets forming a part of respective labels. Methods and apparatus for forming multiple up books suitable for such operations will be appreciated by those of ordinary skill in the art from a reading of the foregoing.

In each of the above labels, where a tear line is provided to open the respective label, double, parallel perforations may be provided to facilitate opening.

While a preferred embodiment of the present invention has been described, it will be appreciated by those of skill in the art that certain modifications may be made without departing from the scope of the present invention. All such modifications are intended to come within the scope of the claims which follow.

What is claimed is:

1. A booklet for displaying information, comprising:

a) an outer piece including a top panel and a bottom panel joined by an outer fold, said top panel having an upper surface and said bottom panel having an upper surface and a lower surface;

b) an inner piece separately formed from said outer piece and disposed between said top and bottom panels, said inner piece having a pair of interior panels joined by an inner fold;

c) attaching means coupling said outer and inner pieces to one another at said outer and inner folds; and d) a tear line formed in said bottom panel adjacent said outer fold;

e) a layer of adhesive directly engaging said lower surface of said bottom panel;

f) first indicia disposed on said upper surface of said top panel; and g) second indicia disposed on said upper surface of said bottom panel, said second indicia being substantially identical to said first indicia.

2. The booklet of claim 1 wherein said bottom panel includes an extended flap extending beyond adjacent respective edges of said top and interior panels.

3. A booklet for displaying information, comprising:

a) an outer piece including a top panel and a bottom panel joined by an outer fold, said bottom panel including an extended flap including an inner extended flap portion and an outer extended flap portion, said inner extended flap portion having a release varnish coating on an upper surface thereof;

b) an inner piece disposed between said top and bottom panels having a pair of interior panels joined by an inner fold, said extended flap extending beyond adjacent respective edges of said top and interior panels, c) attaching means coupling said outer and inner pieces to one another at said outer and inner folds; and d) a tear line formed in said bottom panel adjacent said outer fold.

4. A booklet for displaying information, comprising:

a) an outer piece including a top panel and a bottom panel joined by an outer fold, said top panel including an extended flap;

b) an inner piece separately formed from said outer piece and disposed between said top and bottom panels, said inner piece having a pair of interior panels joined by an inner fold, said extended flap extending beyond adjacent respective edges of said bottom and interior panels;

c) attaching means coupling said outer and inner pieces to one another at said outer and inner folds; and d) a tear line formed in said bottom panel adjacent said outer fold.

5. A booklet for displaying information, comprising:

a) a unitary outer piece including a top panel and a bottom panel joined by an outer fold, said bottom panel including a first extended flap including an inner extended flap portion and an outer extended flap portion, said top panel including a second extended flap overlying said inner extended flap portion of said first extended flap;

b) a unitary inner piece disposed between said top and bottom panels having a pair of interior panels joined by an inner fold, each of said interior panels having a respective free edge opposite said inner and outer folds, said first extended flap extending beyond adjacent respective edges of said top and interior panels and said second extended flap extending beyond said adjacent respective edges of said interior panels;

c) attaching means coupling said outer and inner pieces to one another at said outer and inner folds; and d) a tear line formed in said bottom panel adjacent said outer fold.

6. A booklet for displaying information, comprising:

a) a unitary outer piece including a top panel and a bottom panel joined by an outer fold, said top panel including a first extended flap including an inner extended flap portion and said bottom panel including a second extended flap underlying said inner extended flap portion of said first extended flap;

b) a unitary inner piece disposed between said top and bottom panels having a pair of interior panels joined by an inner fold, each of said interior panels having a respective free edge opposite said inner and outer folds, said first extended flap extending beyond adjacent respective edges of said bottom and interior panels and said second extended flap extending beyond said adjacent respective edges of said interior panels;

c) attaching means coupling said outer and inner pieces to one another at said outer and inner folds; and d) a tear line formed in said bottom panel adjacent said outer fold.

7. The booklet of claim 1 wherein said top panel includes a first extended flap and said bottom panel includes a second extended flap, each of said first and second extended flaps extending beyond adjacent respective edges of said interior panels, said first and second extended flaps releasably secured to one another by adhesive.

8. The booklet of claim 7 wherein said first and second extended flaps have substantially the same length.

9. A booklet comprising:

a) a bottom panel;

b) a top panel having first and second opposed ends and overlying said bottom panel, said first end of said top panel connected with said bottom panel along a first fold;

c) a first interior panel disposed between said bottom panel and said top panel, said first interior panel connected with said second end of said top panel along a second fold;

d) at least one second interior panel disposed between said first interior panel and said top panel, said second interior panel having a free edge opposite said second fold; and e) attaching means coupling said second interior panel and said first interior panel at said second fold.

10. The booklet of claim 9 wherein each of said bottom panel and said top panel include a marginal portion extending between said first fold and at least one of said first and second interior panels.

11. The booklet of claim 10 further including a tear line formed in said top panel in said respective marginal portion.

12. The booklet of claim 9 wherein said bottom panel includes an extended flap extending adjacent and beyond said second fold.

13. A booklet for displaying information, comprising:

a) an outer piece including a top panel and a bottom panel joined by an outer fold, said top panel including an extended flap, said extended flap including an inner extended flap portion and an outer extended flap portion;

b) an inner piece disposed between said top and bottom panels having a pair of interior panels joined by an inner fold, said extended flap extending beyond adjacent respective edges of said bottom and interior panels;

c) attaching means coupling said outer and inner pieces to one another at said outer and inner folds;

d) a first tear line formed in said bottom panel adjacent said outer fold; and e) a second tear line formed in said inner extended flap portion.

14. The booklet of claim 13 further including title indicia disposed on an upper surface of said top panel and primary indicia disposed on an upper surface of said outer extended flap portion.

15. A booklet for displaying information, comprising:

a) an outer piece including a top panel and a bottom panel joined by an outer fold, said bottom panel including a first extended flap, said first extended flap including an inner extended flap portion and an outer extended flap portion, said top panel including a second extended flap, said second extended flap overlying said inner extended flap portion of said first extended flap;

b) an inner piece disposed between said top and bottom panels having a pair of interior panels joined by an inner fold, said first extended flap extending beyond adjacent respective edges of said top and interior panels and said second extended flap extending beyond said adjacent respective edges of said interior panels;

c) attaching means coupling said outer and inner pieces to one another at said outer and inner folds;

d) a first tear line formed in said bottom panel adjacent said outer fold; and e) a second tear line formed in said second extended flap.

16. A booklet for displaying information, comprising:

a) an outer piece including a top panel and a bottom panel joined by an outer fold, said top panel including a first extended flap including an inner extended flap portion, said bottom panel including a second extended flap underlying said inner extended flap portion of said first extended flap;

b) an inner piece disposed between said top and bottom panels having a pair of interior panels joined by an inner fold, said first extended flap extending beyond adjacent respective edges of said bottom and interior panels and said second extended flap extending beyond said adjacent respective edges of said interior panels;

c) attaching means coupling said outer and inner pieces to one another at said outer and inner folds;

d) a first tear line formed in said bottom panel adjacent said outer fold; and e) a second tear line formed in said inner extended flap portion.

17. The booklet of claim 16 further including title indicia disposed on an upper surface of said top panel and primary indicia disposed on an upper surface of said outer extended flap portion.

* * * * *

UNITED STATES PATENT AND TRADEMARK OFFICE

CERTIFICATE OF CORRECTION

PATENT NO. : 6,027,780

DATED : February 22, 2000

INVENTOR(S) : Carl W. Treleaven, Glenn A. Grosskopf, Keith R. Dovel

It is certified that error appears in the above-indentified patent and that said Letters Patent is hereby corrected as shown below:

ON THE TITLE PAGE

Item [56]

In References Cited, U.S. PATENT DOCUMENTS
Delete "2,532,017" and replace with -- 2,532,011 --

In References Cited, FOREIGN PATENT DOCUMENTS
Delete "W0901218" and replace with -- W09014218 --

Signed and Sealed this

Twenty-seventh Day of March, 2001

*Attest:*

Nicholas P. Godici

NICHOLAS P. GODICI

*Attesting Officer*

*Acting Director of the United States Patent and Trademark Office*